US007690990B2

(12) United States Patent
Van Luchene

(10) Patent No.: US 7,690,990 B2
(45) Date of Patent: Apr. 6, 2010

(54) FINANCIAL INSTITUTIONS AND INSTRUMENTS IN A VIRTUAL ENVIRONMENT

(75) Inventor: Andrew Stephen Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 771 days.

(21) Appl. No.: 11/421,025

(22) Filed: May 30, 2006

(65) Prior Publication Data

US 2007/0087816 A1 Apr. 19, 2007

Related U.S. Application Data

(60) Provisional application No. 60/727,121, filed on Oct. 14, 2005.

(51) Int. Cl.
*G06F 17/00* (2006.01)

(52) U.S. Cl. .......................................... 463/25; 463/29

(58) Field of Classification Search ............. 463/16–29; 705/1, 25

See application file for complete search history.

(56) References Cited

U.S. PATENT DOCUMENTS

| | | | |
|---|---|---|---|
| 5,970,470 | A | 10/1999 | Walker |
| 6,009,458 | A | 12/1999 | Hawkins et al. |
| 6,188,993 | B1 | 2/2001 | Eng et al. |
| 6,341,353 | B1 | 1/2002 | Herman et al. |
| 6,615,190 | B1 | 9/2003 | Slater |
| 6,929,550 | B2 | 8/2005 | Hisada |
| 2001/0019965 | A1 | 9/2001 | Ochi |
| 2001/0044774 | A1 | 11/2001 | Sasazawa |
| 2002/0072412 | A1 | 6/2002 | Young et al. |
| 2002/0086733 | A1 | 7/2002 | Wang |
| 2002/0160838 | A1 | 10/2002 | Kim |
| 2003/0115134 | A1* | 6/2003 | Kikuchi et al. ................ 705/38 |
| 2003/0225619 | A1 | 12/2003 | Dokken |
| 2004/0043806 | A1 | 3/2004 | Kirby et al. |
| 2004/0139004 | A1 | 7/2004 | Cohen |
| 2005/0033601 | A1 | 2/2005 | Kirby et al. |
| 2005/0137015 | A1 | 6/2005 | Rogers et al. |
| 2005/0143174 | A1 | 6/2005 | Goldman et al. |
| 2005/0177428 | A1 | 8/2005 | Ganz |
| 2005/0182693 | A1 | 8/2005 | Alivandi |
| 2005/0187012 | A1 | 8/2005 | Walker et al. |
| 2005/0192087 | A1 | 9/2005 | Friedman et al. |
| 2005/0192864 | A1 | 9/2005 | Ganz |
| 2005/0250415 | A1 | 11/2005 | Barthold |
| 2005/0288095 | A1 | 12/2005 | Walker et al. |
| 2006/0035692 | A1 | 2/2006 | Kirby et al. |
| 2006/0079150 | A1 | 4/2006 | Filoseta et al. |
| 2006/0100018 | A1 | 5/2006 | Ganz |
| 2006/0178180 | A1 | 8/2006 | Jung et al. |
| 2006/0178217 | A1 | 8/2006 | Jung et al. |
| 2006/0178218 | A1 | 8/2006 | Jung et al. |
| 2006/0178899 | A1 | 8/2006 | Jung et al. |
| 2006/0178964 | A1 | 8/2006 | Jung et al. |
| 2006/0178965 | A1 | 8/2006 | Jung et al. |
| 2006/0178966 | A1 | 8/2006 | Jung et al. |
| 2006/0178967 | A1 | 8/2006 | Jung et al. |
| 2006/0178968 | A1 | 8/2006 | Jung et al. |

(Continued)

*Primary Examiner*—Ronald Laneau

(57) ABSTRACT

A virtual environment including various virtual financial institutions and instruments is described. According to some embodiments, some of the virtual financial instruments may be guaranteed by real world financial instruments such as a credit card. Accordingly, various virtual financial transactions such as virtual loans, virtual venture capital investments, virtual banking and virtual insurance are provided.

14 Claims, 6 Drawing Sheets

U.S. PATENT DOCUMENTS

| | | | | |
|---|---|---|---|---|
| 2006/0178970 | A1 | 8/2006 | Jung et al. | |
| 2006/0178972 | A1 | 8/2006 | Jung et al. | |
| 2006/0178985 | A1 | 8/2006 | Jung et al. | |
| 2006/0190283 | A1 | 8/2006 | Jung et al. | |
| 2006/0190284 | A1 | 8/2006 | Jung et al. | |
| 2006/0195394 | A1 | 8/2006 | Jung et al. | |
| 2006/0200396 | A1* | 9/2006 | Satterfield et al. | 705/35 |
| 2006/0224505 | A1 | 10/2006 | Jung et al. | |
| 2006/0229976 | A1 | 10/2006 | Jung et al. | |
| 2007/0208640 | A1* | 9/2007 | Banasiak et al. | 705/35 |

* cited by examiner

FINANCIAL INSTITUTIONS AND INSTRUMENTS IN A VIRTUAL ENVIRONMENT

PRIORITY CLAIM

The following application claims priority to U.S. Provisional Application Ser. No. 60/727,121 "Methods, Processes, and System to Enhance a Player Experience of a Video Game" filed Oct. 14, 2005, which is hereby incorporated by reference in their entirety for all purposes.

BACKGROUND

Video games which are accessible to multiple players via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games.

DETAILED DESCRIPTION

Figure 1:
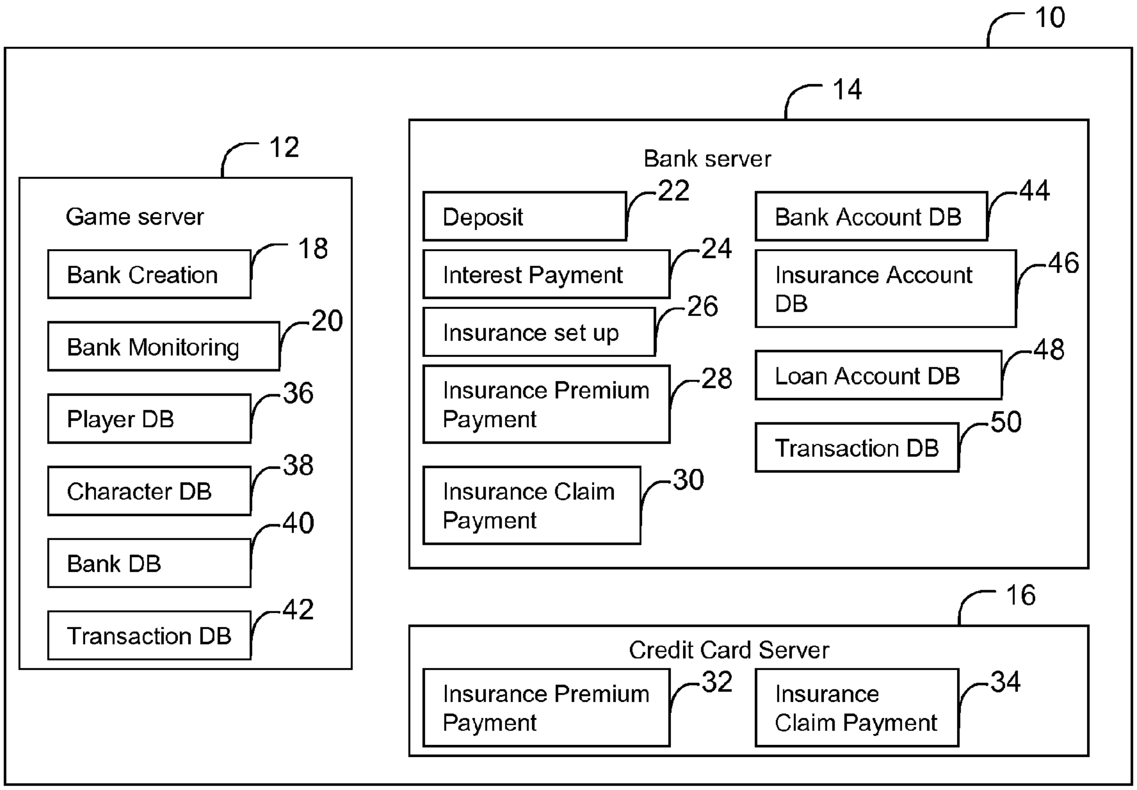
FIG. 1 is a block diagram of a system 10 according to one embodiment of the present invention.

Definitions:

Unless stated to the contrary, for the purposes of the present disclosure, the following terms shall have the following definitions:

Credit Card—a credit instrument issued by a real world institution to a player that allows the player to make purchases by providing an account identifier (e.g. a credit card number) rather than cash or other currency. An example is a credit card like those issued by Visa, Mastercard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, and the like.

Virtual credit card—a financial instrument issued in a virtual environment that acts in the virtual environment for virtual currency the way a real world credit card acts in the real world for real currency.

Real Cash Value—the value in real dollars of the obligation. This value can be determined by multiplying the financial obligation value by the then published exchange rate to real dollars.

Game Environment—an online game such as World of Warcraft or a virtual community such as Second Life.

Total virtual obligation amount—the total amount of virtual financial obligations associated with a player character account.

Virtual Contract—An enforceable agreement between a player character and either another player character or a game server. Some examples of virtual contracts are provided in U.S. Provisional Patent Application Ser. No. 60/652,036, which is hereby incorporated by reference in its entirety for all purposes.

Virtual—shall mean in a game environment or other intangible space.

Virtual World—an online game such as World of Warcraft or a virtual community such as Second Life or There.com.

Virtual Creditor—shall mean a first player character who is owed a virtual obligation by a second player character.

Virtual Credit Score—a score given to player characters in a video game based on any one or more of the virtual assets they possess, the age of the character account, the type of account, e.g. basic or premium, the available credit line of the credit card associated with the account, the existing virtual financial obligations of the player character account, the player character's payment history including days to play, amounts overdue or delinquent, and/or the player character's real world credit score.

Virtual Financial Account—a virtual account issued to a player character by a virtual bank where virtual cash can be deposited and withdrawn.

Virtual Bank—an entity in a virtual world or MMPOG that can provide financial accounts and issue financial obligations to player characters. The virtual bank can be controlled, for example, by a game server, bank server, and/or one or more players or player characters.

Virtual Financial Obligation—An agreement by a player character or entity to pay one or more game attributes to another player character, entity or the game server. This obligation can be a one time payment, or multiple payments over time. The obligation can specify that payments are due on virtual or real dates.

Virtual Financial Obligation Value—the in game value of the obligation. For virtual cash the value is stated as a virtual cash amount. For other game attributes, the value can be determined by generating a virtual cash market value for the item based on the current value in an online marketplace or exchange. The value of the obligation can also be set as a condition of the player contract.

Billing Information—shall mean any information pertaining to billing a player including a billing address, credit card account, bank account, pay pal account or other payment information.

Character or "player character"—shall mean a persona created by a player in a video game.

Avatar—the virtual representation of a player character.

Character Account—shall mean an account that tracks character attributes.

Character Attribute—shall mean any quality, trait, feature or characteristic a particular Character can have that is stored in the corresponding Character Account. Character Attributes shall include, but not be limited to:

A character score
A virtual object
The physical appearance of a character
An emblem or mark
A synthetic voice
Virtual money
Virtual help points or credits
The ability to join groups of other players at a later time
A score for subsequent matching of later game parameters
A relationship with another character
A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Computer Generated Character—shall mean any character that is generated by the system rather than being another player character.

Game Parameter—shall mean any part of a Video Game by which characters can be measured. Game Parameters shall include, but not be limited to:

1. Completing all or part of a mission
2. Playing for a certain period of time
3. Winning a match against another player character or computer generated character
4. Reaching a certain level or score
5. using or obtaining an ability or technology
6. kill/death ratios
7. obtaining an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials
18. producing goods or services
19. earning income
20. earning a higher rank in an army
21. winning an election among two or more player characters
22. achieving deity status
23. improving player character status or caste
24. assisting other player characters with any of the above
25. speed of accomplishing any of the above In-game Marketplace—shall mean a virtual environment where Characters can exchange Attributes.

Massive Multi Player Online Video Game (MMPOG)—Shall mean a Video Game that is played using either a network of a Video Game Central Server and at least two Video Game Consuls or a peer-to-peer network of at least two Video Game Consuls. Players create Characters that may interact with each other in a Video Game Environment that is stored on the Video Game Central Server and the Video Game Consuls. An example of an MMPOG is World of Warcraft.

Novice Player—Shall mean a player that is flagged as requiring the help of an expert to complete a Game Parameter.

NPC—(non player character) a computer generated character in the game

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

Real Money
Discount of monthly fees for playing game
Monthly fee for playing a game
Global character attribute settings for all characters created by player across multiple games.
Rewards for encouraging another player to signup to play Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—shall mean a game played on a Video Game Consul that may or may not be networked to a Video Game Central Server or within a peer-to-peer network.

Video Game Consul—shall mean a device comprising a CPU, memory and optional permanent storage residing at a player location that can allow for the playing of video games. Examples include, home PCs, Microsoft Xbox, and Sony Playstation.

Video Game Central Server—shall mean a CPU, memory and permanent or temporary storage that is connected to multiple Video Game Consuls that allows for Massive Multi Player Online Video Games to be played.

Video Game Environment—Shall mean a virtual video game world that is stored on the combination of the Video Game Central Server and Video Game Consuls where Characters interact and games are played.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Description

According to one or more embodiments, the present invention provides a virtual bank secured by credit cards. According to this embodiment, a virtual environment may include a virtual bank where players of a video game can deposit virtual cash or allocate an available credit line on a credit card and receive interest paid in virtual cash to their player character account. Other player characters can request a loan of virtual cash by agreeing to secure the loan with an available credit line on a credit card, which may be the player character's real world credit card and/or that of another player character and/or a non-playing third party, such as a bank, credit institution, credit card company, insurance company, etc. or any combination of these.

According to one or more embodiments, the present invention provides a virtual environment in which characters are able to make virtual deposits. According to this embodiment, a player character deposits virtual cash (e.g., which he may have earned by playing the game and/or by creating and selling virtual objects within the game to other players, or otherwise) and/or a player character agrees to allocate a credit line on a credit card associated with the player account in exchange for a periodic interest payment. The game or virtual bank server may periodically determine an average balance over a fixed time period, multiply the balance by a specified interest rate, and pays the interest amount in virtual cash to a player account. Said time periods and/or interest rates may be established or determined by any suitable method including, but not limited to, by a) the game manufacturer, b) the owner(s) of the server(s) upon which the game resides, c) one or more player characters, d) market forces, e) negotiation among the affected parties, f) any combination of these.

According to an alternate embodiment, the allocation of the credit card credit line serves to insure the virtual bank's ability to cover deposits in the bank. In this embodiment, if more withdrawal requests on the bank exist than can be covered by the virtual cash the bank has on hand, the bank can charge the real cash value of the virtual cash shortfall to the credit cards that players or other entities have registered to secure the bank's deposits.

According to another embodiment, the credit cards can be charged based on one or more conditions. For example, in the event of a shortfall, a player can receive a higher insurance premium if he allows his credit card to be charged first or in a higher proportion relative to other credit cards securing the bank. Alternatively or additionally, a player could be paid a lower premium rate if he only secures certain types of deposits (e.g., less risky). Alternatively, credit lines can be charged in equal increments until the total shortfall amount is covered. Alternatively, the credit lines can be charged relative to the shortfall amount as compared with each player's committed amount, i.e., as a percentage of the shortfall. For example, if the total shortfall is $100 in real currency, and there are two credit cards securing the shortfall, one offering $1,000 and the other offering $100, the first card may be charged $90, while the second is charged $10, each representing that portion of the shortfall as a percentage of the commitments associated with the credit cards. Of course, a combination of these methods or any other terms as negotiated among the affected parties may be used to determine how a shortfall is allocated among the affected parties.

According to another embodiment, player characters that deposit virtual cash or allow their credit card to secure the bank can specify what types of and amounts of virtual loans they are willing to back. As non-limiting examples, virtual loans could be provided for:

1. Purchasing a fixed number and/or type or types of virtual asset(s)
2. Lending the virtual money for a fixed maximum time period
3. Lending the virtual money to player characters with a certain amount of virtual assets in the game or a certain age or skill level in the game environment.
4. Lending the virtual money to player characters with a certain real or virtual credit score.
5. Lending virtual money at a specified interest rate, which rate may be fixed for the term of the loan or which may vary based upon any one or more variables including, the term, changes in the borrowers status, credit scores (real or virtual), assets (real or virtual), over time, rate of defaults on loans within the game environment in general or for the lender, tied to other interest rates (real or virtual), total amount of loans outstanding within the game and/or by the lender and/or the player character, etc.
6. Lending virtual money to player characters in exchange for services or goods
7. A specific listing of player characters that are acceptable and/or unacceptable to the lender for whatever reason or no reason.

According to another embodiment, player characters who deposit virtual cash could receive a higher interest rate if their virtual cash is not secured by a credit card of another player character or the bank.

According to another embodiment, player characters can specify a maximum percentage of a loan they are willing to back. For instance, a player character may indicate he does not want to lend more than 10% of a given loan to any particular player character.

According to another embodiment, player characters can specify that a certain percentage of their cash be lent to other player characters with varying virtual credit scores. For instance 40% of the loans could go to player characters with a high credit score, 30% to characters with a low credit score, and 30% to characters with a mid credit score. Based on this ratio, an interest rate can be determined and paid.

According to another embodiment, the bank can guaranty a deposit by locking credit cards lines associated with it in an amount that is greater than, or a percentage of, or equal to an amount of virtual cash (and/or which amount may be adjusted based upon projected inflation, exchange rates or other factors) that has been deposited by a player character. Player characters can receive a lower interest payment (or other terms) for deposits that are secured in this manner. If the player character withdraws his deposit from the bank and the funds are not available, the credit card line used to cover the deposit can be charged the real cash value equal to the requested virtual cash withdrawal amount and/or the credit line can be released as appropriate.

An exemplary system 10 configured to provide the virtual environment described above is shown in FIG. 1. As shown, system 10 includes a game server 12, a bank server 14 and a credit card server 16. Game server 12 may include a bank creation program 18 and a bank monitoring program 20. Bank server 14 may include a deposit program 22, an interest payment program 24, an insurance set up program 26, an insurance premium program 28 and an insurance claim payment program 30. Credit card server 16 may include an insurance premium payment program 32 and an insurance claim payment program 34.

It can be seen that game server 12 may further comprise a plurality of databases including, for example, a player database 36, a player character database 38, a bank database 40, and a transaction database 42.

Player database 36 may comprise information such as:

1. Player ID
2. Credit Card Information
3. Personal Information
4. Billing Information
5. Character ID 1-n Character database 38 may comprise information such as:

1. Character Attributes 1-n
2. Character Accounts 1-n
3. Account Balances 1-n
4. Character Assets 1-n
5. Character Obligations 1-n Bank database 40 may comprise information such as:

1. Bank ID
2. Owner ID 1-n
3. Owner Percentage 1-n
4. Deposit Accounts 1-n
5. Loan Accounts 1-n
6. Insurance Accounts 1-n
7. License fee (upfront)
8. License fee (recurring)

Transaction database 42 may comprise information such as:

1. Transaction ID
2. Bank ID 1-n
3. Player Character ID 1-n
4. Transaction Data

It can be seen that Bank server 14 may further comprise a plurality of databases including, for example, bank account database 44, insurance account database 46, loan account database 48, and transaction database 50.

Bank account database 44 may comprise information such as:

1. Bank Account ID
2. Player Character ID 1-n
3. Virtual Cash Deposit 1-n
4. Deposit Interest Rate 1-n
5. Conditions 1-n
6. Deposit time period 1-n
7. Deposit early withdrawal penalty 1-n
8. Deposit type (secured/unsecured)

Insurance account database 46 may comprise information such as:

1. Insurance Account ID
2. Player Character ID 1-n
3. Credit Card # 1-n
4. Credit Line Secured 1-n
5. Conditions 1-n
6. Virtual Cash Interest Rate Loan account database 48 may comprise information such as:

1. Loan Account ID
2. Player Character ID 1-n
3. Credit Card # 1-n
4. Conditions 1-n
5. Amount
6. Payments
7. Interest Rate 8. Start Date
9. Payment Date(s)
10. Type
11. Automated withdrawal
12. Penalties (1-n)

Transaction database 50 may comprise information such as:

1. Transaction ID
2. Transaction Date
3. Transaction Type
4. Transaction Amount

According to one embodiment, game server 12 may be configured to create a virtual bank using some or all of the following method steps:

1. Receive a request from a player character or group of player characters or one or more third parties to create a bank
2. Determine if there is an available license for the bank based on the game environment and the player characters
3. If there is an available license determine and output a license fee
4. Receive an acceptance and payment for the license fee
5. Create new bank with the player character(s) as owners.

According to another embodiment, game server 12 may be configured to monitor the bank using some or all of the following method steps:

1. Receive deposits and issued and outstanding loan obligations
2. Receive interest and principal payment records
3. Determine if payment records correspond to deposits and loan obligations
4. If the data does not correspond, flag bank as suspect According to one embodiment, bank server 14 may be configured to create a virtual bank using some or all of the following method steps:

1. Create and Output a request to create a bank
2. Receive a license amount if applicable
3. Pay license amount if applicable
4. Receive bank registration number According to one embodiment, bank server 14 may be configured to manage a virtual bank using some or all of the following method steps:

1. Create a transaction record
2. Transmit record to game server
3. Receive indication that record was received According to one embodiment, bank server 14 may be configured to manage deposits to a virtual bank using some or all of the following method steps:

1. Receive a request to deposit a sum of virtual cash from a player character, including a deposit time period, deposit type, loan conditions, and player character information
2. Determine and output an interest rate based on any one or more of the deposit time period, loan conditions and player character information to the player character
3. Receive an acceptance of the interest rate and other terms from the player character
4. Receive funds from the player character
5. Create new deposit record
6. Notify game server and player character that new deposit record was created According to one embodiment, bank server 14 may be configured to manage interest payments provided by a virtual bank using some or all of the following method steps:

1. Retrieve a deposit record and determine an interest payment based on the deposit record criteria
2. Deposit payment into player character account
3. Create new interest payment record
4. Notify player character that interest payment was made According to one embodiment, bank server 14 may be configured to set up insurance using some or all of the following method steps:

1. Receive a request from a player character to secure virtual loans with credit card credit line including a credit card number, amount of credit line available, and acceptable conditions.
2. Validate that credit card number is good and credit line is available
3. Determine an insurance rate payment based on the request
4. Output rate to player character
5. Receive acceptance of rate
6. Secure credit line of player character and create insurance record
7. Notify game server and player character that insurance record was created According to one embodiment, bank server 14 may be configured to manage insurance premium payments using some or all of the following method steps:

1. Retrieve insurance record and generate a premium payment amount based on record data
2. Deposit virtual payment into player character account
3. Notify game server and player character that premium payment was made According to one embodiment, bank server 14 may be configured to manage insurance claim payments using some or all of the following method steps:

1. Receive a request to withdraw a virtual cash deposit from the bank
2. Determine that there is not enough virtual cash available to cover the withdrawal request and generate a virtual cash shortfall amount
3. Determine a real cash to virtual cash conversion rate
4. Determine a real cash value equal to virtual cash withdrawal shortfall
5. Optionally, notify affected parties of pending credit card charges
6. Optionally, provide affected parties with the option to transfer virtual cash into the account to avoid actual credit card charges
7. Determine available credit lines based on conditions
8. Charge credit lines the real cash value of the remaining shortfall based on conditions
9. Convert real cash to additional virtual cash
10. Payout the requested virtual cash withdrawal.

According to one embodiment, the present invention provides a system of virtual loans. According to this embodiment, a player character may request a loan from the virtual bank by registering a credit card and an amount of credit line he is willing to use as collateral against the virtual loan. The bank may validate and lock in the available credit line on the credit card, retrieves the player character account information, including, for example, the player character's credit score, and determine a loan amount and interest payment for the loan based on the credit line and the player character information.

According to another embodiment, the maximum loan amount, interest percentage rate, and pay period on the loan can be effected by any one or more of the following including:

1. The virtual or real world assets of a player character
2. The level or skill level of a player character
3. The trend or rate of change of the skill level of the player character.
4. The age of the character account 5. The type of player account, e.g., basic or premium
6. The player character's previous payment history or performance
7. The existing outstanding debt or other virtual loans outstanding to the player character
8. The player character's purpose or intended use of the proceeds of the virtual loan.
9. The current or projected interest rates and/or inflation rate and/or exchange rate(s) within the game and/or the real world.
10. The current or projected interest rates charged by the credit card companies.
11. The current or projected stability or future prospects of the game.

According to another embodiment, the game server could prohibit the player character from converting an amount of virtual cash or assets equal to, or greater or less than the loan amount into real cash.

According to another embodiment, the game server could prohibit the (borrowing) player character from spending loan proceeds, i.e., virtual cash equal to, or any portion or percentage of, the balance of the loan on anything other than virtual assets and/or services specified by the loan.

According to another embodiment, the game server could prohibit the player character from reselling or otherwise encumbering the virtual assets purchased with the virtual loan until such time as the virtual loan is repaid.

According to another embodiment, the game server could establish a limit for additional loans and/or prohibit the player character from further borrowing until the loan is repaid. Limits for additional borrowing could be based upon the player characters virtual or real net worth, debt to equity ratio, total virtual amount, total monthly payment amount, or other financial constraints established by the lender.

According to another embodiment, a player character could be limited from lending money to himself, another player character controlled by the same player, or a player character that is a family member, guild member, or affiliated in some way the player character who deposited money in the bank.

According to another embodiment, the loan could be structured so that it is convertible for a percentage ownership of the item or asset that it was used to purchase (and/or in addition to additional assets and/or penalties). In this embodiment the player character who took the loan or the bank that issued the loan can convert the loan obligation into a percentage ownership of the asset(s) that the loan was used to purchase. The terms of the conversion could be specified in the loan agreement and the conversion rate may change over time as the loan balance is reduced.

According to another embodiment, rather than a loan, the bank could decide to just take a percentage of the venture that a player character was presenting. This decision can be made by the game server based on the venture and the player character credit scores or credit line and/or manually.

According to another embodiment, the virtual bank could be run by the game server or by player characters or by non-playing third parties.

According to another embodiment, a credit line can secure the loan payment amount, the entire loan amount, or a ratio of the two. In calculating the amount, factors such as game growth rates, taxes, inflation and/or exchange rates may be considered in determining the total amount to secure on the credit line. Growth rates, taxes, inflation and/or exchange rates may be those associated with real and/or virtual currency valuations/obligations and/or predicted trends or combinations of these factors.

According to another embodiment, credit lines can be frozen by the bank owner, and/or just periodically "pinged." If and when the virtual loan is repaid, the amount secured by credit line could then be released. Alternatively, as the loan is paid down, a percentage of the credit line may be released in proportion to or in some other ratio with the amount paid. In this example, the credit line is reduced as the loan is repaid, instead of waiting for the entire loan to be repaid, thus freeing credit lines for new loans security.

According to another embodiment, a player character or virtual bank can loan money to another player character and receive loan payments without those loan payments being secured by a credit card. The first player character establishes a request for an amount of money. A second player character (or, alternatively, two or more player characters or a virtual bank) agrees to loan the first player character the money for a term and with an interest rate and the virtual money is placed in escrow with the central server. When the first player character agrees to the loan terms of the second player character, the central server releases the funds and tracks the payments due from the first player to the second player. This method may also be used with loans that are secured with a credit card line of credit.

According to another embodiment, the game server can automatically charge the virtual loan payment amount to the appropriate player account, or the bank server can send an invoice or other notice to the player. If either (i) the player account does not have adequate funds for the game server to withdraw the virtual loan payment amount or (ii) the player character does not pay the invoice sent by the bank then a real cash value can be determined for the virtual loan payment amount and charged to the credit card associated with the player character or, if applicable, with a third party or other player character who agreed to secure the loan for the defaulting player character.

According to another embodiment, instead of or in addition to interest payments, the bank and/or game server or lender may receive compensation or fees for processing the initial loan and/or for subsequent payment processing.

According to another embodiment, the game server or bank may restrict a delinquent player character from entering into any other virtual loan or other indebtedness.

According to another embodiment, the first (i.e., borrower) player character can be excluded from owning land or engaging in other contracts if he has not made a loan payment to a bank.

According to another embodiment, a bank or game server may impose or enforce a lien on a player character that is delinquent in paying any loan amount when due.

According to another embodiment, players can pay an additional up front or recurring fee so that their characters can issue or take loans from other player characters or NPCs According to another embodiment, banks can be permitted by the game server, or a territory or town in the game environment to set up a virtual presence and do business. A bank may have to buy a virtual permit to do business in each location where it has a branch in the game environment. The virtual permit may be a one-time fee and/or may require periodic payments that are fixed or variable, which may be based upon the total amount of funds in the depository, loans outstanding, revenues generated, interest rates or interest received, number of borrowers, number of defaulting borrowers, percentage of secured vs. unsecured loans, total number of banks, real or virtual tax rates for similar real or virtual institutions within the game or similar games, vote by a group of player characters and/or an entity or player character elected to represent the player characters, the game manufacturer, by the game, which determination may be based upon market forces and/or an auction or reverse auction, or, in the case of one player character or group of player characters wishing to sell their bank to another player character(s), for an amount as determined by the sellers and/or as determined by any of the foregoing. Variable payments might be based upon the amount of loans outstanding and/or interest collected or total payments received, or any combination of these or other variables.

According to another embodiment, player characters can choose, at any time, whether they want a loan to be charged to their virtual cash account or their credit card on file or any combination of these options.

According to another embodiment, a virtual debit card can be issued to the player character that can be used to make purchases in the game. The use of the card may be limited to purchases that are specified in the loan obligation or by the account (in the case of a loan not being involved). Player characters can give these debit cards to other player characters who can use the outstanding or remaining balance on them for virtual purchases specified when the debit card was created. Debit cards can be given to a first player character when a second player character relies on the first player character to purchase something for him, but cannot trust the player character with virtual cash that has unrestricted purchase parameters. Debit cards can be used to create in game payment vehicles that can only be used to purchase certain virtual assets and/or services.

According to another embodiment, percentages of the debit card value can be allocated to different virtual asset classes. For instance, 50% of the value could be used to buy specific raw materials and 40% could be used to purchase services from specific NPCs and player characters to turn those raw materials into a specific product. The remaining 10% of the value could be used by a player character for anything, but, for example, only when the other 90% has been spent to create the specific product and that product has been deposited into the debit card issuer's account.

According to another embodiment, an amount of the player credit line can be released equal to the real cash value of the principal portion of a virtual loan payment when that payment is made. Alternatively, the initial credit line lock can be held until the loan is paid in full.

According to another embodiment, some loans may have priority over other loans, i.e., if a player character enters bankruptcy or otherwise defaults on any loan, some loans may recover from the assets of the player character before those of other loans. Priority of loans may be established at the time the loan is secured and/or based upon the date secured, for example, giving preference to loans secured earlier over those secured later on.

According to another embodiment, a program that tracks and displays all available credit lines, current loans, available loans, including their terms and conditions, such as interest rates, a listing of players wishing to borrow or loan money, etc., is accessible by player characters. Banks, and/or Player characters may use this program to determine if they wish to loan or borrow virtual cash and/or commit part or all of their available credit line to the game, bank or player character(s), along with terms and conditions for its use.

According to another embodiment, loans may be issued with or without collateral. Collateral may be real world or virtual assets and/or promises to perform certain services.

According to another embodiment, credit score can be virtual or real world or a combination of these scores. When deciding to issue a virtual loan, the actual real world credit score of a player character can be used to determine whether to issue the loan and the interest rate amount and/or other terms or restrictions or limitations.

According to another embodiment, the exchange rate can be zero and can also be adjustable based on inflation rates (again real or virtual or a combination of these), etc.

According to another embodiment, the exchange rate can be determined at the time the loan agreement is created or when a player's credit card actually needs to be charged for the real cash value of a virtual loan payment.

According to another embodiment, the interest rate can be determined at the time the loan agreement is created and/or may be adjustable over time based upon any one or more of: a) real or virtual interest rates, b) payment performance, c) adherence to loan restrictions or other terms, d) number of initial or subsequent defaults on loans by the player character, e) real or virtual credit scores, or any other financial or other terms as determined by the lender and agreed upon by the borrower.

According to another embodiment, in the event a real world credit card is canceled that was being used to secure part or all of a loan or that otherwise serves as collateral and/or to ensure a payment, the system could receive a notice of such cancellation and could: a) make any and all outstanding loans secured by such a credit card or line of credit immediately due and payable and/or b) require the lender and/or borrower to provide a new credit instrument and/or c) require additional collateral to secure the loan (provided by either the credit card holder and/or the borrower), d) secure a back up line of credit that was offered a credit card holder to "reinsure" the original card holder, and/or e) notify other player characters of the opportunity to use their credit card to secure the loan (for the same or different terms and benefits) and/or any combination of these options.

Figure 2:
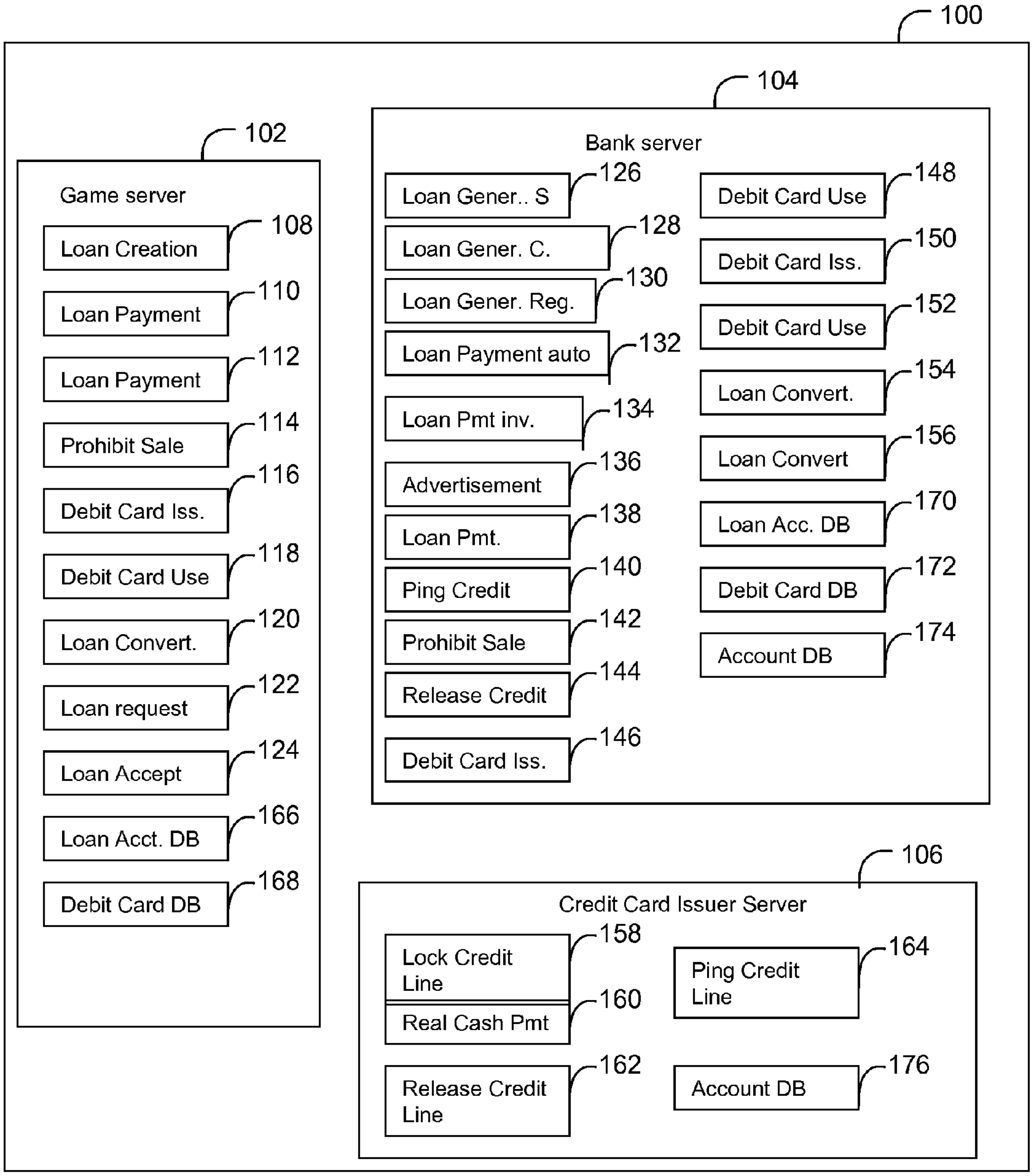
FIG. 2 is a block diagram of a system 100 according to one embodiment of the present invention.

An exemplary system 100 configured to provide the virtual environment described above is shown in FIG. 2. As shown, system 100 may include a game server 102, a bank server 104, and a credit card issuer server 106.

Game server 102 may include a Loan Creation Program 108, whereby a bank server can register a loan with the game server. Game server 102 may further include a simple Loan Payment Program 110, a complex Loan Payment Program (complex) 112, a Prohibit Sale of Virtual Assets Program 114, a Debit Card Issuance Program 116, a Debit Card Usage Program 118, a Loan Converted to Shares of Asset Program 120, a Loan request program (no bank) 122 and a Loan acceptance program (no bank) 124.

Bank Server 104 may include a simple loan Generation Program 126, a complex Loan Generation Program 128 a register Loan with game server program 130, a Loan Payment Program (automatic) 132, a Loan Payment Program (invoice) 134, an Advertisement program 136, a Loan Payment Program (choice of real or virtual cash) 138, a Ping Credit Line 140, a prohibit Sale of Virtual Assets Program 142, a Release Credit Line when Loan is paid 144, a Debit Card Issuance Program 146, a Debit Card Usage Program 148, a Debit Card Issuance Program (register debit card with game server) 150, a Debit Card Usage Program (register debit card with game server) 152, a Loan Converted to Shares of Asset Program (bank managed) 154, and a Loan Converted to Shares of Asset Program (game server managed) 156.

Credit Card Issuer Server 106 may include a Lock Credit Line Program 158, a Real Cash Payment Program 160, a Release Credit Line 162, and a Ping Credit Line program 164.

As shown, game server 102 may further include a plurality of databases including, as non-limiting examples:

A Loan Account Database 166, which may include information such as:

1. Bank ID
2. Loan Account ID
3. Player Character ID 1-n
4. Credit Card # 1-n
5. Conditions 1-n
6. Amount
7. Payments
8. Interest Rate
9. Start Date
10. Payment Date(s)
11. Type
12. Automated withdrawal?
13. Penalties (1-n)

A Debit Card Database 168, which may comprise information such as:

1. Bank ID
2. Debit Card ID
3. Debit Card Amount by category 1-n
4. Debit Card Issue Date
5. Debit Card Conditions 1-n Bank Server 104 may include a Loan Account Database 170, which may comprise information such as:

1. Bank ID
2. Loan Account ID
3. Player Character ID 1-n
4. Credit Card # 1-n
5. Conditions 1-n
6. Amount
7. Payments
8. Interest Rate
9. Start Date
10. Payment Date(s)
11. Type
12. Automated withdrawal
13. Penalties (1-n)

Bank server 104 may also include a Debit Card Database 172, which may comprise information such as:

1. Bank ID
2. Debit Card ID
3. Debit Card Amount by category 1-n
4. Debit Card Issue Date
5. Debit Card Conditions 1-n Bank server 104 may also include an Account Database 174, which may comprise information such as:

1. Account ID
2. Player ID
3. Deposit Amount
4. Balance
5. Conditions 1-n

Credit Card Server 106 may also include a similar account database 176.

According to one embodiment, loan creation program 108 may be configured to:

1. Receive an indication that a virtual loan has been created from a bank, including the loan amount, conditions, and bank ID and player character IDs
2. Create and Store virtual loan record According to one embodiment, simple loan payment program 110 may be configured to:

1. Receive an indication that a loan payment has been made
2. Store loan payment with loan record According to one embodiment, Prohibit Sale of Virtual Assets program 114 may be configured to:

1. Receive a request to sell a virtual item from a player character.
2. Determine if there is an outstanding loan or lein against either the player character or on the item
3. If there is an outstanding loan or lien, prohibit the sale of the item and notify player character
4. or
5. If the purchase price is equal to or exceeds the lien or loan amount, allow the sale of the item and immediately pay down the loan obligation with the proceeds
6. or
7. If the purchase price is equal to or exceeds the loan amount allow the sale of the item but lock up an amount of the proceeds of the sale equal to all or a portion of the outstanding loan amount According to one embodiment, Debit Card Issuance program 116 may be configured to:

1. Receive an indication that a debit card was issued from a bank including player character info, bank info, debit card amount and conditions
2. Create and store debit card record According to one embodiment, Debit Card Usage program 118 may be configured to:

1. Receive an indication that the purchase of a virtual item or service will be paid for with a virtual debit card
2. Determine if purchase qualifies based on debit card conditions (if any)
3. If purchase is qualified, allow purchase and deduct virtual cash from the account balance.
4. If purchase is not qualified, disallow purchase
5. Notify bank that purchase was attempted and made According to one embodiment, Loan Converted to Shares of Asset program 120 may be configured to:

1. Receive a request to convert all or a portion of an outstanding loan into shares of a virtual asset by a virtual bank server or player character
2. Retrieve and amend loan obligation
3. Retrieve and amend ownership structure of virtual asset
4. Notify loan parties and owners of asset that loan has been converted into shares of a virtual asset According to one embodiment, simple Loan Generation program 126 may be configured to:

1. Receive a request to borrow virtual cash including a player character ID, a credit card number, and/or a credit line amount
2. Validate credit card number and credit line amount
3. Determine a virtual cash loan amount based on credit line amount
4. Determine an interest rate and virtual cash payment schedule
5. Output a loan offer including a virtual cash loan amount, interest rate and virtual cash payment schedule to player character
6. Receive acceptance of loan offer from player character
7. Lock credit line
8. Create new loan record
9. Output virtual cash to player character account According to one embodiment, complex Loan Generation program 128 may be configured to:

1. Receive a request to borrow virtual cash including a player character ID, a credit card number, and/or a credit line amount, an virtual asset to purchase or build with the loan,
2. Validate credit card number and credit line amount 3. Retrieve player character account to access credit score of player character
4. Determine a virtual cash loan amount based on credit line amount, virtual asset being purchased or created, and credit score of player character
5. Determine an interest rate and virtual cash payment schedule based on credit line amount, virtual asset being purchased or created, and player character credit score.
6. Output a loan offer including a virtual cash loan amount, interest rate and virtual cash payment schedule to player character
7. Receive acceptance of loan offer from player character
8. Lock credit line
9. Create new loan record
10. Output virtual cash to player character account According to one embodiment, Loan Generation program 130 may be configured to:

1. Create a new loan record
2. Notify game server that loan record has been created According to one embodiment, Loan Payment program 132 may be configured to:

1. Retrieve loan agreement
2. Determine if payment is due
3. If payment is due, determine virtual cash payment amount due
4. Withdraw amount from player character account
5. If player account does not have enough virtual cash to cover payment,
6. Determine a real cash value of the virtual payment
7. Retrieve credit card used to secure loan
8. Charge real cash value to credit card
9. Notify player that credit card was charged According to another embodiment, Loan Payment program 132 may be configured to:

1. Retrieve loan agreement
2. Determine if payment is due
3. If payment is due, determine virtual cash payment amount due
4. Withdraw amount from player character account
5. If player account does not have enough virtual cash to cover payment, notify owner of credit card securing said loan
6. If credit card owner chooses to pay debt with virtual cash, notify borrower and update loan balances due, along with any additional interest or penalties, otherwise:
7. Determine a real cash value of the virtual payment
8. Retrieve credit card used to secure loan
9. Charge real cash value to credit card
10. Notify player that credit card was charged According to one embodiment, Loan Payment (invoice) program 134 may be configured to:

1. Retrieve loan agreement
2. Determine if payment is due
3. If payment is due, determine virtual cash payment amount
4. Determine advertisement(s) based on player character activity
5. Generate invoice including virtual cash payment amount, date due, and advertisements
6. Transmit payment to player character
7. Determine if virtual payment was made on or before date due
8. If virtual payment was not made
9. Determine a real cash value of virtual payment
10. Retrieve credit card associated with loan agreement
11. Charge real cash value of virtual payment to credit card According to one embodiment, Loan Payment (invoice) program 134 may be configured to:

1. Retrieve loan agreement
2. Determine if payment is due
3. If payment is due, determine virtual cash payment amount
4. Determine advertisement(s) based on player character activity
5. Generate invoice including virtual cash payment amount, date due, and advertisements
6. Transmit payment to player character
7. Determine if virtual payment was made on or before date due
8. If virtual payment was not made notify owner of credit card securing said loan
9. If credit card owner chooses to pay debt with virtual cash, notify borrower and update loan balances due, along with any additional interest or penalties, otherwise:
10. Determine a real cash value of virtual payment
11. Retrieve credit card associated with loan agreement
12. Charge real cash value of virtual payment to credit card According to one embodiment, Loan Payment program 138 may be configured to:

1. Determine that a loan payment is due
2. Determine value of loan payment in real and virtual cash
3. Output notification to player character that loan payment is due including payment options and values
4. Receive payment option choice from player character
5. If option choice was virtual, remove virtual cash amount from player character account
6. If option was real, retrieve credit card associated with loan and charge real cash amount to credit card According to one embodiment, Ping Credit Line program 140 may be configured to:

1. Determine that a player character has an outstanding virtual loan
2. Determine real and virtual cash value of loan
3. Retrieve credit card associated with loan
4. Ping credit card for the outstanding real cash value of the loan amount
5. If credit equal to loan amount is not available
6. Liquidate virtual assets of player character equal to virtual cash value of virtual loan
7. Deposit virtual cash in loan account to pay off loan According to one embodiment, Release Credit Line when Loan is paid program 144 may be configured to:

1. Receive indication that final payment of virtual loan has been received
2. Retrieve credit card associated with virtual loan
3. Notify credit card issuer to release credit line According to one embodiment, Release Credit Line when Loan is paid program 144 may be configured to:

1. Receive indication that a periodic payment of virtual loan has been received
2. Retrieve credit card associated with virtual loan
3. Notify credit card issuer to release an equal or other determined portion of the credit line.

According to one embodiment, Debit Card Issuance program 148 may be configured to:

1. Receive a request to create a debit card including a virtual cash amount, a specified receiver of the card, and conditions (if any) for spending the virtual cash from one or more player characters.
2. Create debit card including usage conditions (if any)
3. Transfer cash from player character(s) account(s) to debit card 4. Output debit card to specified receiver
5. Notify player character(s) and game server that debit card was created and issued
6. Update debit card bank database According to one embodiment, Debit Card Usage program 150 may be configured to:

1. Receive request to use debit card from a player character to purchase an in game good or service or to pay a debt.
2. Determine if use falls within debit card condition parameters (if any)
3. Allow use if condition parameters allow it
4. Don't allow use if it falls outside of condition parameters
5. Notify player character using debit card, player character(s) who created debit card, and game server if debit card was used or not allowed to be used.
6. Update remaining cash balance According to one embodiment, Loan Converted to Shares of Asset Program 154 may be configured to:

1. Determine that a virtual loan should to be converted into shares of a virtual asset
2. Convert virtual loan into virtual asset
3. Notify player character(s) associated with loan and game server that virtual loan has been converted into virtual asset According to one embodiment, Loan Converted to Shares of Asset Program 156 may be configured to:

1. Determine that a virtual loan should to be converted into shares of a virtual asset
2. Transmit conversion request to game server
3. Receive notice that virtual loan has been converted into virtual asset from game server According to one embodiment, bank server 104 may be configured to:

1. Receive credit card number and credit line from a player character
2. Retrieve player character profile
3. Validate available credit line on credit card
4. Determine amount of virtual loan and interest rate based on credit line and player character profile
5. Output loan offer to player character
6. Receive acceptance of offer from player character
7. Lock credit line for all or a portion of loan value
8. Create Loan Contract
9. Output Loan Contract to Player Character
10. Receive virtual signature of contract from Player Character
11. Deposit Loan amount into player character account.

According to one embodiment, the invention provides a virtual environment in which Venture Capital (VC) Funds are run by Player Characters. In this embodiment, rather than, or in addition to, issuing loans, the virtual bank can act as a VC fund. It can receive proposals for building virtual projects and fund the virtual projects in exchange for a percentage ownership in the asset. The VC agreement can specify the percentage ownership, guaranteed dividends, percentage of profit or revenue dividends, and other obligations that the player character receiving the VC funding has to pay to the bank. The game server can automatically remove these benefits from the player character account and transfer them to the bank. If the player character cannot fulfill their obligation to pay a dividend or other required payment to the bank, the credit card associated with the player character account can be charged the real cash value of the dividend amount.

According to one embodiment, the VC may receive preferential payments as with a "preferred stock."

According to one embodiment, a player character may be limited to the number of VC funds in which he can participate. The maximum number could be dependent upon:

1. The monthly fee the player pays to play the game
2. The age of the account
3. The skill level of the character
4. The virtual net worth of the player or player character According to one embodiment, the VC can issue virtual cash to the project accounts as an up front fee, or over time as pieces of the project are completed.

According to one embodiment, the dividend payments may or may not be secured by credit cards.

Figure 3:
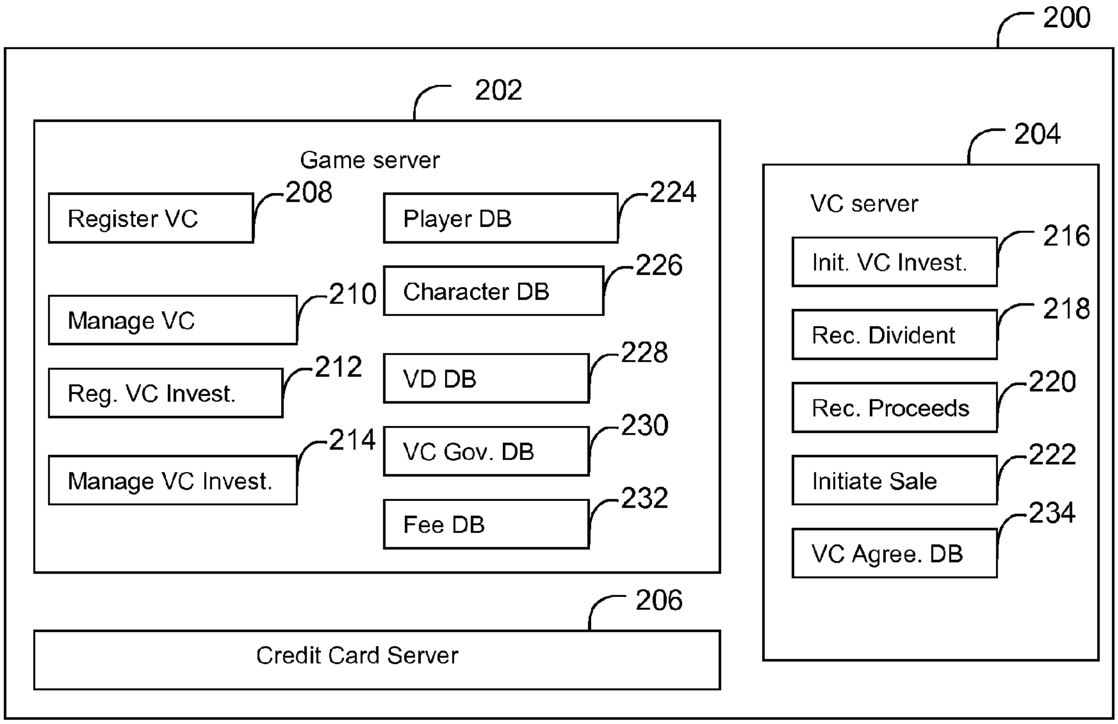
FIG. 3 is a block diagram of a system 200 according to one embodiment of the present invention.

FIG. 3 provides an exemplary system 200 configured to provide the virtual environment described above. As shown, system 200 includes a game server 202, a VC server 204 and a credit card server 206. Game server 202 may include a register VC program 208, a manage VC program 210, a register VC Investment program 212, and a manage VC investment program 214. VC server 204 may include an Initiate VC Investment Program 216, a Receive Dividend Program 218, a Receive Proceeds from Sale of Assets Program 220, and an Initiate Sale of Assets Program 222.

Game Server 202 may further comprise a plurality of databases including player database 224, player character database 226, VC database 228, VC Governance rules database 230, and fee database 232.

Player Database 224 may comprise information such as:

1. Player ID
2. Personal Info
3. Billing Info
4. Characters 1-n

Player Character Database 226 may comprise information such as:

1. Character ID
2. Characters Assets
3. Character Obligations
4. Character Accounts VC Database 228 may comprise information such as:

1. VC ID
2. Owner ID 1-n
3. Owner Percentage 1-n
4. Assets 1-n
5. Accounts 1-n
6. Virtual Location VC Governance Rules database 230 may comprise information such as:

1. Rule ID
2. Rule Description

Fee Database 232 may comprise information such as:

1. Fee Type
2. Fee amount
3. Fee conditions

VC Server 204 may comprise a VC Agreements database, which may comprise information such as:

1. Agreement ID
2. Agreement Parties 1-n
3. Party Type
4. Agreement Terms and Conditions According to one embodiment, Register VC program 208 may be configured to:

1. Receive a request to register a virtual Venture Capital fund including the VC owners, VC assets, VC location, and VC accounts
2. Determine if a permit is available for the VC
3. If a permit is available determine a permit price 4. Output permit price
5. Receive acceptance of permit price
6. Create VC fund
7. Output notice that fund is created
8. Charge VC fund account the permit price According to one embodiment, Manage VC program 210 may be configured to:

1. Determine that a VC must pay a permit fee
2. Output notice to player character owners of VC that a permit fee is due.
3. Receive a payment
   Or
4. If no payment is received by x time period, suspend VC activity.

According to one embodiment, Register VC Investment program 212 may be configured to:

1. Receive a VC agreement
2. Determine if agreement terms and conditions fall within VC governance rules
3. If agreement satisfies rules, create an agreement ID
4. Transmit ID to parties of agreement
5. Activate Agreement
6. Charge activation fee to VC account According to one embodiment, Manage VC Investment program 212 may be configured to:

1. Receive an indication that a VC investment has a dividend payment due
2. Output dividend request to investment
3. Receive dividend payment
4. Transmit payment to VC
5. Generate and Charge the VC a dividend payment processing fee
   or
6. If dividend payment is not received after x time period
7. Notify VC and investment that dividend was not received
8. Determine a penalty
9. Apply penalty
10. Charge VC fund fee for applying penalty According to one embodiment, Initiate VC Investment program 216 may be configured to:

1. Receive a request to fund a virtual project from one or more player characters including a virtual project plan, virtual blueprint, a virtual cash budget, and amount of virtual cash necessary to complete the project
2. Determine a project value based on the project request and the credit scores of the player characters
3. Determine an ownership investment structure based on the value, and the credit scores of the player characters
4. Output an investment offer, including an ownership percentage, a required dividend schedule, an investment payment schedule and other terms and conditions to the player characters
5. Receive an acceptance of the offer
6. Create a new virtual project including a virtual account and transfer appropriate virtual cash into project account
7. Register agreement with Game Server According to an alternate embodiment, Initiate VC Investment program 216 may be configured to:

1. Receive a request to fund a virtual project from one or more player characters
2. Determine an ownership investment structure for the project
3. Output investment structure to player characters
4. Receive acceptance of structure
5. Transmit virtual project and ownership investment structure to Game Server
6. If structure is accepted,
   A. receive registration number
   B. notify player character's the project was accepted
   C. transmit virtual money for project to project account
   D. transmit virtual cash fee to game server to register complete project registration
7. if structure is not accepted
   A. receive notice of why structure was not accepted, including changes required to make it acceptable from the game server
   B. revise structure according to change requests
   C. transmit revised structure to player characters
   D. Receive acceptance of revised structure
   E. Transmit revised structure to game server for approval
   F. receive registration number
   G. notify player character's the project was accepted
   H. transmit virtual money for project to project account
   I. transmit virtual cash fee to game server to register complete project registration According to an embodiment, Receive Dividend program 218 may be configured to:

1. Determine that a dividend is due
2. Determine a dividend amount based on virtual project performance and investment structure conditions
3. Output request for dividend payment
4. Receive payment
   Or
5. If payment is not received, retrieve credit card(s) associated with project,
6. Determine a real cash value of the virtual cash dividend
7. Charge real cash value to credit card(s)

According to an alternate embodiment, Receive Divided program 218 may be configured to:

1. Receive a virtual dividend for a virtual investment from the game server
2. Deposit virtual cash into virtual account
3. Flag investment as "dividend paid"

According to an embodiment, Receive Proceeds from Sale of Assets program 220 may be configured to:

1. Receive and indication of or initiate the sale of a virtual asset
2. Receive a virtual cash amount for the sale of the asset
3. Determine virtual proceed amount(s) based on ownership percentage defined by investment agreement
4. Transmit virtual cash proceed amounts to owners of asset based on ownership percentages According to another embodiment, Receive Proceeds from Sale of Assets program 220 may be configured to:

1. Receive an indication of or initiate the sale of a virtual asset
2. Determine virtual proceed amount based on ownership percentage defined by investment agreement
3. Transmit request for virtual proceed amount to player character(s) who own the asset including a virtual cash amount and a date due
4. Receive a virtual cash payment equal to the virtual proceed amount
   Or
5. If a virtual cash payment is not made by the date specified,
6. Retrieve the credit card(s) on file associated with the investment
7. Determine a real cash value equal to the real cash value of the virtual proceed amount
8. Charge the real cash value to the credit card(s)

According to another embodiment, Receive Proceeds from Sale of Assets program 220 may be configured to:

1. Receive or Request the sale of a virtual asset
2. Receive a selling price
3. Receive a virtual cash value based on the ownership percentage defined by the investment agreement
4. Mark investment record as sold According to another embodiment Initiate Sale of Assets program 222 may be configured to:

1. Receive an indication that a virtual dividend payment for a virtual asset has not been received by a specified date
2. Register virtual asset for sale
3. Receive virtual proceeds of sale
4. Retain proceeds equal to dividend payment, ownership percentage, and fees and transmit remainder to player characters who own asset.

According to another embodiment, Initiate Sale of Assets program 222 may be configured to:

1. Transmit a notice that a virtual dividend payment has not been received for a virtual asset by a specified date
2. Receive virtual proceeds from the sale of the virtual asset equal to the dividend payment, ownership percentage, and fees
3. Flag virtual asset record as sold According to another embodiment, the present invention provides a virtual environment in which a player who registers to play a game on the game server or sets up an account with the bank server is offered the chance to sign up for a credit card whereby the unused credit line is used to secure deposits in the virtual bank in exchange for a monthly interest payment. The credit card can pay benefits in the form of virtual cash that are deposited into the game account of the player character as they accrue.

According to an alternate embodiment, The credit card can pay a percentage of the monthly charges in the form of virtual cash to the player character account.

According to another embodiment, only credit cards that have been issued by the game server or its bank co brand partner can be used to secure virtual loans and or deposits in the game.

According to another embodiment, a Virtual Rewards Program may be offered to players or player characters. Player characters that make use of virtual credit cards may accumulate points based upon their usage and/or payment habits. Points may be exchanged for real or virtual objects and/or real or virtual cash. Points may be exchanged for virtual skills, favors, training or education, secrets or secret codes, that, for example, permit entry into a specific area, or solves a puzzle, or provides a hint to solve a puzzle, or provides a "get out of jail free card" or an option to "go back in time" or to improve a player's strength, or recovery rate, or to receive part or all of any maps, avatar features or upgrades, lower real or virtual interest rates, and other in game or real world products, services, devices, and the like.

According to another embodiment, virtual cash can be issued to the player character account for real world purchases made with the card.

Figure 4:
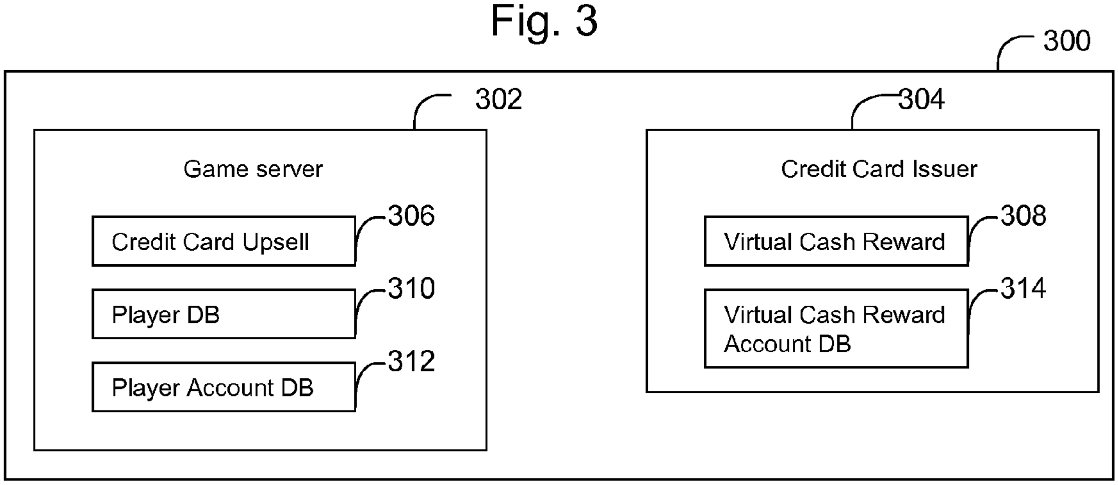
FIG. 4 is a block diagram of a system 300 according to one embodiment of the present invention.

FIG. 4, depicts an exemplary a system 300 in which the virtual environment described above may be implemented. As shown, system 300 may include a game or bank server 302 and a credit card issuer server 304. Game or bank server 302 may include a credit card upsell program 306. Credit card issuer server 304 may include a virtual cash reward generation program 308.

According to the depicted embodiment, game or bank server 302 may further comprise a player database 310 and a player account database 312.

Player Database 310 may comprise information such as:

1. Player ID
2. Billing Info
3. Personal Info
4. Character ID 1-n

Player Account Database 312 may comprise information such as:

1. Player ID
2. Account Number
3. Credit Line Available
4. Credit Line Secured
5. Virtual Cash Payment Percentage for Secured Line
6. Virtual Cash Payment for Purchases made with Card
7. Reward Conditions
8. Transactions 1-n Credit Card Issuer Server 304 may include a virtual cash reward account database 314, which may include information such as:

1. Account ID
2. Game Account ID
3. Reward Conditions
4. Transactions 1-n

According to one embodiment, credit Card Upsell Program 306 may be configured to:

1. Receive a player character log in
2. Determine if Player Character qualifies for a credit card based on personal info, game play behavior, billing info, real world credit score and/or virtual world credit score
3. Determine a virtual benefit for the player character if he signs up and/or uses the credit card
4. If player qualifies output credit card upsell including benefit(s)
   - A. Receive acceptance of upsell offer, including personal information from player character
   - B. Transmit personal information to credit card issuer
   - C. Receive new credit card account information
   - D. Output information to player character According to one embodiment, Virtual Cash Reward Generation Program 308 may be configured to:

1. Receive card usage activity of a player character from card issuer
2. Determine virtual cash reward based on conditions and usage activity
3. Transmit virtual cash reward to player account According to another embodiment, Virtual Cash Reward Generation Program 308 may be configured to:

1. Determine a real cash compensation value for the virtual cash reward
2. Transmit cash compensation value to credit card issuer for reimbursement According to yet another embodiment, Virtual Cash Reward Generation Program 308 may be configured to:

1. Receive a virtual cash award amount for a player character from the card issuer
2. Deposit virtual cash award into player account.

According to an embodiment, Virtual Cash Reward Generation Program 338 may be configured to:

1. Retrieve usage of virtual cash reward card over a fixed time period
2. Generate a virtual reward based on conditions and card usage
3. Retrieve player character account
4. Transmit virtual cash reward to player account According to another embodiment, Virtual Cash Reward Generation Program 338 may be configured to:

1. Output card usage activity of a player character to a game server
2. Receive a real cash compensation value from the game server
3. Transmit the real cash compensation value to the game server According to another embodiment, the present disclosure provides methods and system for Determining a Virtual Credit Score for a Player Character in a virtual environment. According to this embodiment, the bank or game server can calculate, update and maintain a credit score for each player character in the game. The system may track any one or more of the activity, payment habits, assets and other player characteristics and/or attributes of each player character in either the real world and/or the virtual world or both, and a credit score is generated. The player character credit score can be based on any one or more of the following, including, but not limited to:

1. The age of the player and/or player character account
2. The amount of virtual assets of the player character
3. The real cash and/or virtual credit line of the real and/or virtual credit cards associated with the player character's account
4. The total amount and/or number of outstanding real or virtual obligations of the player character
5. The payment history of outstanding real and/or virtual obligations of the player character
6. The skill, level or number of experience points of the player character
7. The guild, family, or other group standing of the player character.
8. The ratio of the player's real and/or virtual assets to outstanding real and/or virtual obligations or other indebtedness
9. The player character's account type, e.g., basic or premium
10. The player character's real world credit score
11. The reliability of the player character to perform other virtual obligations, such as favors, services owed, virtual help, and/or results of bartering or other interactions with other player characters, and the like.
12. Any one or more of financial ratios such as real or virtual net worth or debt to equity ratios, or debt payment obligations/real or virtual income or any other financial ratios or calculations that are well known and used within the prior art and/or the credit card or banking industries.
13. Any combination of the preceding.

According to an alternate embodiment, players who do not pay back loans, interest or other payments when due and/or do not pay on time, may have a lower credit score.

According to another embodiment, player characters that have a lot of debt and make payments may have a higher score.

According to another embodiment, credit scores may affect interest rates current or subsequent loans by NPCs or other player characters.

According to another embodiment, interest rates may be fixed and/or variable.

According to another embodiment, players may be placed on credit hold so that they cannot request additional loans.

According to another embodiment, players may be placed on credit watch, which may restrict their financial dealings other than acquiring new loans, e.g., prevent selling assets.

According to some embodiments, the net worth of a player character can be constantly or periodically monitored based on the value of the assets he owns in the game environment vs. what similar assets have sold for to other player characters in the past.

According to another embodiment, the credit score of a player character may be based in part on the credit scores of other characters associated with that player account. Or one virtual credit score can be given to the player that can be used by all of his characters in the game environment.

According to another embodiment, in the event one of a player's multiple player characters defaults on any loan and/or any other contractual agreement and/or any other financial obligation, that default may be considered as a default for all of his characters in the game environment.

Figure 5:
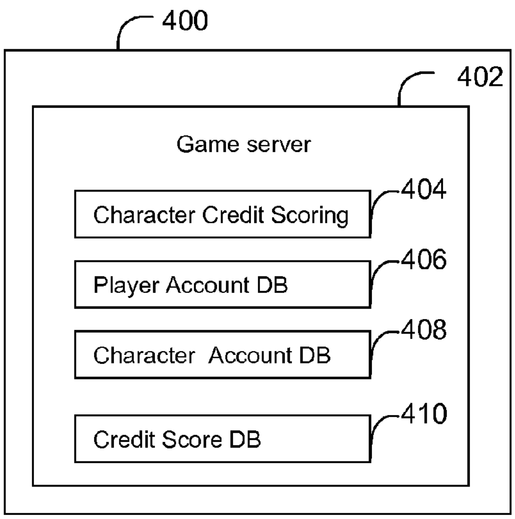
FIG. 5 is a block diagram of a system 400 according to one embodiment of the present invention.

According to one embodiment, a table based, rules driven, or genetic algorithm type program can generate and store credit scores for player characters FIG. 5 provides an exemplary system 400 configured to provide the virtual environment described above. As shown, system 400 includes a game server 402 which may include a player character credit scoring program 404. System 400 may further include a plurality of databases such as player account database 406, player character database 408, and credit score conditions database 410.

According to one embodiment, Player Account Database 406 may comprise data such as:

1. Player ID
2. Player Billing Info
3. Player Personal Info
4. Play History
5. Real World Credit Score
6. Virtual World Credit Score
7. Character ID 1-n According to an embodiment, Player Character Database 408 may comprise data such as:

1. Character ID
2. Character Assets
3. Character Play History
4. Character Attributes
5. Character Credit Score According to an embodiment, Credit Score Conditions database 410 may comprise data such as:

1. Condition ID
2. Condition Descriptor

According to one embodiment player character credit scoring program 404 may be configured to establish a credit score by performing some or all of the following steps:

1. Retrieve player and player character attributes
2. Apply credit score conditions to attributes
3. Generate credit score
4. Store score in player or player character account According to another embodiment of the present invention, games or players may establish rules and conditions under which a player may declare bankruptcy. The effect of a bankruptcy may be any one or more of the following, including, but not limited to:

1. Temporary or lifetime banishment from the game.
2. A required repayment of all or a percentage of debts owed plus interest and/or penalties to those who suffered from the bankruptcy before a player character can play in the game again.
3. A flag set to require cash payments to continue play, plus some additional amount which will payoff the outstanding debt, and/or interest and/or penalties, over time
4. A complete or partial forgiveness of debts.

5. Real debts, e.g. those secured by a credit line, are less likely to be partially or completely forgiven, whereas artificial debts, e.g., promise to provide a service, may be more easily relieved.

Figure 6:
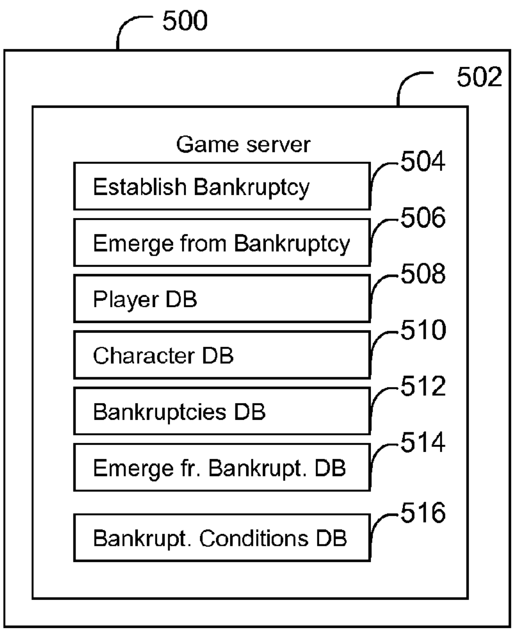
FIG. 6 is a block diagram of a system 500 according to one embodiment of the present invention.

FIG. 6 provides an exemplary system 500 in which a virtual environment is configured to allow player characters to declare bankruptcy. According to the depicted embodiment, system 500 includes a game server 502 which may include an Establish Bankruptcy Program 504 and an Emerge from Bankruptcy Program 506. System 500 may further include a plurality of databases including player database 508, player character database 510, bankruptcies database 512, emerge from bankruptcy conditions database 514 and a declare bankruptcy conditions database 516.

According to one embodiment, player Database 508 may comprise data such as:

1. Player ID
2. Player Status
3. Conditions Necessary to Change Status

According to one embodiment, Player Character Database 510 may comprise data such as:

1. Character ID
2. Player ID
3. Character Status
4. Conditions Necessary to Change Status According to one embodiment, Bankruptcies Database 512 may comprise data such as:

1. Bankruptcy ID
2. Status
3. Conditions to Change Status
4. Character ID
5. Player ID According to one embodiment, Emerge from Bankruptcy Conditions Database 514 may comprise data such as:

1. Condition ID
2. Condition Descriptor

According to one embodiment, Declare Bankruptcy Conditions Database 516 may comprise data such as:

1. Condition ID
2. Condition Descriptor

According to one embodiment, Establish Bankruptcy program 504 may be configured to:

1. Receive a request for a virtual bankruptcy or determine that a player and/or player character falls within allowable conditions of bankruptcy
2. Create virtual bankruptcy record
3. Determine and store conditions for player and/or player character to emerge from virtual bankruptcy
4. Set status of player and/or player character to bankrupt
5. Output conditions to emerge from virtual bankruptcy to player character According to one embodiment, Emerge from Bankruptcy program 506 may be configured to:

1. Receive a request to emerge from virtual bankruptcy
2. Output conditions to emerge from virtual bankruptcy
3. Receive indication that player or player character account has satisfied conditions
4. Change status of player and or player character account to not bankrupt According to another embodiment of the present invention, Cities and Corporations in virtual environments can issue bonds and take loans from player characters or other virtual cities.

According to this embodiment, a governing individual or group of player characters in a city or corporation in a game environment can issue a request to borrow money to build a public work or other project in the city. The governing group of player characters of a city can design a building within the confines of the conditions of the city. A price can be determined for the building, and a series of bonds can be made available to player characters and other cities to finance the construction of the project.

For example, a city qualifies to build an aqueduct in its town based on the population count of its non-player character citizens and/or based upon the city's credit rating. Player characters define the architectural plans of the aqueduct and a price to assemble the aqueduct is generated based on the plan and the natural or other materials specified. The city can borrow the money to build the aqueduct from its player character citizens or another city or a combination of these. To prove that it can pay back the loan, the city can show its per turn income from tax revenues (of whatever source), or it can show how the new aqueduct will be paid for by, for example, by selling fresh water to its citizens for a per turn fee or other tax. The fresh water contracts with its citizens could be signed before the loan is issued to assemble the public work. The bond can be secured by the credit cards of player characters who are government representatives or citizens of the city or unaffiliated third party player characters, and/or a real or virtual bank may secure the bonds, and/or any combination of these options.

According to another embodiment, a group of player characters can create a project that requires a loan to fund. A virtual bank can issue a loan to the group of player characters equal to the amount of the credit line the sum of the player characters is willing to make available on their credit card accounts to secure the loan. As, or once, built, the project they have built can also be used as collateral for the loan. Alternatively, the natural or other resources and/or building materials may serve as part or all of the required collateral. If the group of player characters defaults on all or part of the loan, the collateral can first be taken, and/or if its value on the virtual market is insufficient to pay back the loan in full, the credit cards of the group can be charged the balance due.

If a group of credit cards secures a loan, when a default occurs, the credit cards can be charged using any one or more of the following, including, but not limited to:

1. All in equal percentage of the outstanding default until a credit line is maxed out, and then in an equal percentage on the remaining credit lines until no credit line is left on any card.
2. In an order designated by the loan agreement, i.e. charge credit card A first up to the max credit line or a fixed dollar amount, then charge credit card B, etc.
3. All in a ratio specified under the loan agreement, i.e. 40% to credit card A, 20% to credit card B and so on.
4. Any other sequence or amounts as specified in the loan agreement and/or by the game manufacturer, and/or a duly elected or otherwise authorized governing body, and/or the bank or lender.

According to an alternate embodiment, instead of a loan, citizens of the town could each pay a fee in virtual cash to assemble a public work that then allows them to receive the benefit or a percentage of the benefit produced by that public work for free and/or receive a portion of the revenues received by other citizens that did not fund the work, and/or receive a reduced price for receiving benefits from that public work, and/or a reduction in their tax rates and/or a reduction in fees for use of all or some of the other public services available and/or a reduced price to borrow funds, e.g., lower interest rates, of any combination of these options.

Alternatively or additionally, VCs could fund and build the public work and charge a fee to the city's citizens to use it. If the citizens cannot pay the fee, the VC could charge their credit cards the real cash value of the virtual fee amount.

According to another embodiment, utility payments can also be secured by a credit card. Player characters that are citizens of a city can pay a monthly virtual fee to use the utilities of the city. If they fail to pay, the real cash value of their monthly utility bill can be charged to a credit card associated with the player account.

According to another embodiment, players can be co-guarantors. Accordingly, one or more players could sponsor a loan of another player character by posting their available credit lines on their credit cards to secure the loan. In this embodiment, a player character requests a loan and designates one or more other player characters as co-guarantors of the loan. The game server or bank server receives the request for the loan, along with the names of the co-guarantors and outputs a notice of the loan to the players who have been designated as co-guarantors. The co-guarantors can then send an acceptance to the notice, and the bank server locks in the designated amount of their credit card line. Once enough co-guarantors have sent an acceptance to the notice that the loan has been secured, the loan is issued to the player character who requested it.

According to another embodiment, virtual bond can be bought in incremental units or percentage of the whole. For instance, player characters can buy 100 $1 bonds or 1% of a $100 bond.

According to another embodiment, virtual bonds can be traded on virtual exchanges just as regular bonds are traded in the prior art.

According to yet another embodiment, the game server and the bank server can be the same server and the method steps for creating and managing utilities and bonds can be divided between the two. For instance, bond creation can be the responsibility of the bank server and registration and fees can be managed by the game server or vice versa.

Figure 7:
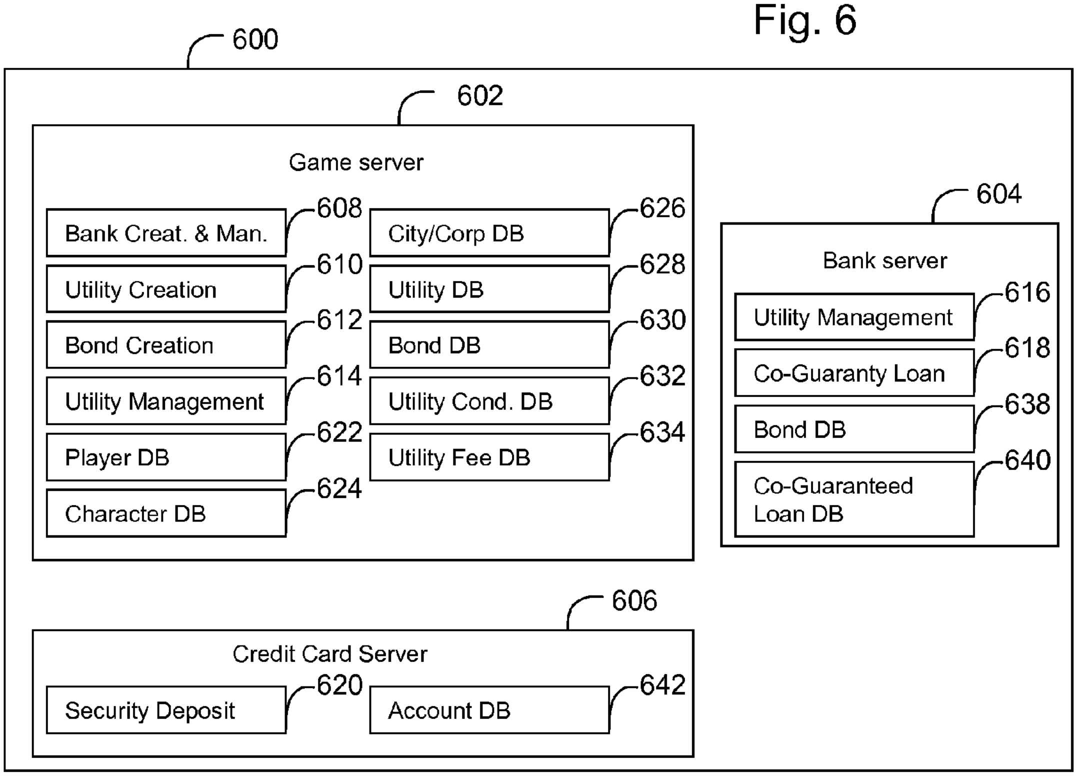
FIG. 7 is a block diagram of a system 600 according to one embodiment of the present invention.

FIG. 7 provides a block diagram of an exemplary system 600 configured to provide a virtual environment including virtual cities and corporations that can issue bonds and take loans from player characters or other virtual cities or corporations. As shown, system 600 includes a game server 602, a bank server 604 and a credit card server 606.

Game Server 602 may include, for example, a Bank Creation and Management Program 608, a Utility Creation Program 610, a Bond Creation Program 612 and a Utility Management Program 614.

According to the depicted embodiment, Bank Server 604 may include a Utility Management Program 616 and a Co Guaranty Loan Program 618.

According to the depicted embodiment, Credit Card Server 606 may include a Security Deposit Program 620.

According to the depicted embodiment, Game Server 602 may further include a plurality of databases including, for example a player database 622, a player character database 624, a city/corporation (or other type such as a guild, etc.) database 626, a utility database 628, a bond database 630, a utility conditions database 632, and a utility fee database 634.

According to the depicted embodiment, Bank server 604 may further include a bond database 638 and a co-Guaranteed loan database 640.

According to the depicted embodiment, Credit Card server 606 may include an account database 642.

According to one embodiment, Player Database 622 may include data such as:

1. Player ID
2. Group ID
3. Player Billing Info
4. Player Characters 1-n

According to one embodiment, Player Character Database 624 may include data such as:

1. Character ID
2. Character Assets and Attributes
3. Groups 1-n

According to one embodiment, City/Corporation (or other group type such as guild, etc) Database 626 may include data such as:

1. Group ID
2. Character Members 1-n
3. Group Assets and Attributes

According to one embodiment, Utility Database 628 may include data such as:

1. Utility ID
2. Group ID(s)
3. Usage Conditions
4. Blueprint
5. Component(s)
6. Owners (s)
7. Ownership Percentage
8. Obligations According to one embodiment, Bond Database 630 may include data such as:

1. Bank ID
2. Utility ID
3. Group ID
4. Bond Conditions
5. Bond Creation Date
6. Bond Creation Schedule According to one embodiment, Utility Conditions Database 632 may include data such as:

1. Condition ID
2. Condition Descriptor
3. Utility types 1-n

According to one embodiment, Utility Fee Database 634 may include data such as:

1. Utility Fee ID
2. Utility Fee Descriptor

According to one embodiment, Bond Database 638 may include data such as:

1. Bond ID
2. Bond Creation Date
3. Bond Amount
4. Group ID
5. City/Corporation ID
6. Bond Amount
7. Bond Conditions
8. Bond Payment Schedule According to one embodiment, Co-Guaranteed Loan Database may include data such as:

1. Loan ID
2. Player Character Co-guarantors 1-n
3. Co Guarantor Credit Cards 1-n According to one embodiment, system 600 may be configured to assemble a bond request. Accordingly system 600 may be configured to:

1. Receive a Group Registration
2. Receive a Utility Plan Blueprint and Project Timeline
3. Receive a Utility business model, including fees for using a virtual utility and number of potential player character users
4. Determine a credit card payment method in the event of a dividend or bond payment default
5. Generate a list of virtual resources and services required to complete Utility based on blueprint 6. Generate a virtual cash value for the virtual resources and services
7. Create and Store a Bond Request based on the group, blueprint, timeline, business model, credit card payment method, resources, services, and cash value,
8. Generate a bond request registration fee
9. Charge fee to group account According to another embodiment, system 600 may be configured to create a bond agreement. Accordingly, system 600 may be configured to:

1. Receive an indication of interest to purchase all or a portion of a bond (from a virtual bank, vc, or player character)
2. Receive a virtual cash payment (and store payment in escrow)
3. If virtual cash payment fulfills bond, notify group that bond request has been filled
4. Issue virtual cash to group based on business plan associated with bond request According to another embodiment, system 600 may be configured to make a bond payment. Accordingly, system 600 may be configured to:

1. Determine that a bond payment is due
2. Withdraw virtual cash amount equal to bond payment amount from Utility account; and
3. Transmit bond payment to bond holders based on ownership structure and conditions Or
4. If utility cannot make bond payment, retrieve character accounts associated with group who registered utility, including credit card information
5. Determine a real cash value for the virtual bond payment amount
6. Determine a credit card charge method based on method specified by group
7. Charge credit card(s) based on charge method until real cash value for the virtual bond payment amount has been collected
8. Convert real cash to virtual cash and transmit bond payment to bond holders based on ownership structure According to yet another embodiment, system 600 may be configured to create a public work with no bond, but instead relying on the citizens to build. Accordingly, system 600 may be configured to:

1. Receive a blueprint for a utility from a group of player characters
2. Determine if group qualifies to build utility
3. Determine if blueprint is acceptable
4. Determine a group of virtual resources and services necessary to build the virtual utility based on the blueprint
5. Determine a virtual cash value
6. Determine a utility registration fee
7. Output virtual cash value and registration fee
8. Receive acceptance of virtual cash value and registration fee
9. Generate utility id number and account
10. Receive virtual cash value from player character group
11. Activate utility record According to still another embodiment, system 600 may be configured to create a public work with no bond, but instead relying on VC's to build. Accordingly, system 600 may be configured to:

1. Receive a utility blueprint (from a VC)
2. Determine a registration fee
3. Output registration fee
4. Receive virtual payment for registration fee
5. Create Utility record According to another embodiment, system 600 may be configured to help a player or player character register to use a public work. Accordingly system 600 may be configured to:

1. Receive a request to use a utility (from a group or player character)
2. Determine a usage fee and a registration fee
3. Output fees
4. Receive payment for fees
5. Register player or group of players to use utility, including player character credit card to be charged if virtual cash is not available for fee.

According to yet another embodiment, system 600 may be configured to charge a fee to use a public work. Accordingly, system 600 may be configured to:

1. Determine a virtual cash fee is due for using a utility,
2. Withdraw virtual cash fee from player character or group of player character accounts.
3. Or
4. If virtual cash fee is not available,
5. retrieve credit card associated with player character, determine a real cash value for the utility fee payment,
6. charge real cash value to credit card,
7. convert real cash into virtual cash,
8. deposit virtual cash into account According to yet another embodiment, system 600 may be configured to Co-guaranty a loan taken out by another player character. Accordingly, system 600 may be configured to:

1. Receive a request for a loan, including a loan amount, a player character ID, a second player character ID, and a credit card associated with a second player character ID.
2. Lock credit line on credit card equal to real cash value of virtual loan amount
3. Issue loan to first player character According to yet another embodiment, system 600 may be configured to sell virtual bonds on an exchange. Accordingly, system 600 may be configured to:

1. Receive a virtual bond ID number from a buying player
2. Retrieve outstanding bond sell offers from selling player for bond ID number
3. Output sell offers
4. Receive an acceptance of an offer from buying player
5. Transfer virtual bond ownership from the selling player to the buying player
6. Transfer virtual cash equal to bond offer price from buying player to selling player According to another embodiment, the present invention provides for item purchase financing options in a virtual environment. According to this embodiment, a first player character can purchase a game attribute from an NPC, the game server or a second player character. Rather than paying the full price for the item upfront, the player character can pay for the item in (e.g. per turn) installments. When the first player makes the purchase of the item, he can choose to pay up front or over time in installments with or without interest and/or with or without other finance or other fees. If the first player character purchases the item with a payment plan, the payment amount may be automatically removed from his account on each turn of the game. Alternatively, the player character may receive an invoice once or each turn and the player character can make the required payment. If the first player does not have sufficient virtual money to make his payment, at the option of the lending player and/or bank or other lender, the item may be removed from his possession and given back to the character from which the purchase was made, the outstanding balance could be paid using the credit line that secured the loan, and/or the player could use real cash to satisfy his virtual payment obligation.

According to another embodiment, financing can be provided by the player selling the item, by another player, or by the game server.

According to still another embodiment, the payments for the item can be secured by a credit card associated with the player character. If the player paying the financing options fails to make a payment, his credit card could be charged a real cash amount equal to the value of the virtual cash. The charge may or may not also include a financing charge, interest or penalty.

According to yet another embodiment, the payment terms can be negotiated and/or fixed by any one or more of the buyer, the seller, or the game server, and/or the player character(s) providing the credit line to secure the loan.

According to another embodiment, players can pay an additional fee for their characters to be able to purchase and/or sell items with payment plans. For example, a player account may cost $14.95 a month, but a premium player account that allows the player characters to engage in loan activity may cost $16.95 a month.

According to another embodiment, player characters can pay real or virtual cash up front on a loan to prepay interest or other costs, which may result in a lowering of the interest rate.

According to another embodiment, the finance option can be automatically generated and displayed on the screen that is used in the game for a player character to make a purchase of a virtual or real world item.

According to yet another embodiment, when buying an item, a player character can set an option that automatically charges a credit card associated with his account if the player character does not have enough virtual cash to buy the item.

According to still another embodiment, the player character that is financing an item cannot sell it or otherwise encumber or remove the item from his possession until it has been paid in full. Alternatively, if the item is sold, the proceeds of the sale can be used to instantly pay off the remaining balance of the financing agreement.

According to another embodiment, rather than the game server itself, a third party bank server or other server can maintain financing agreements.

Figure 8:
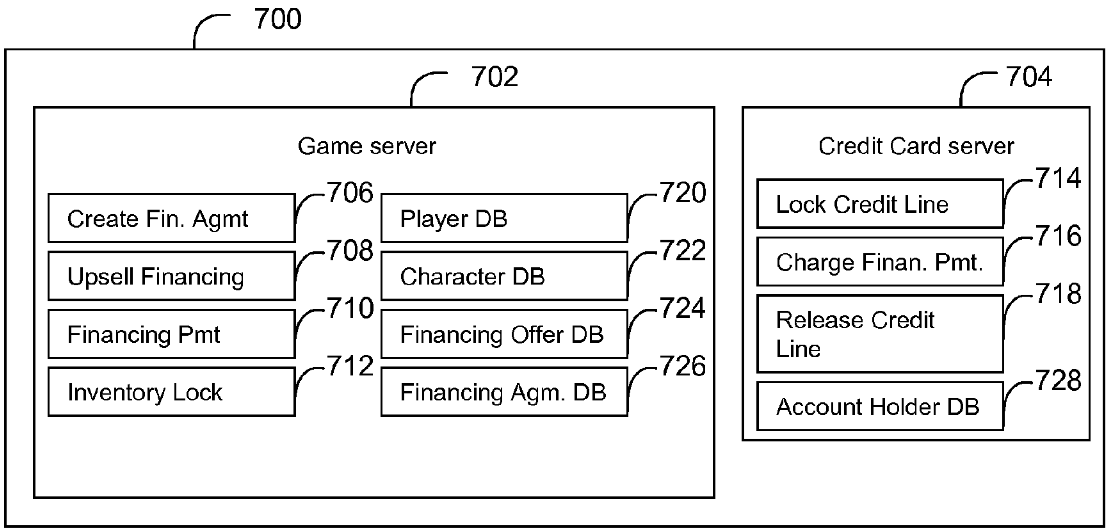
FIG. 8 is a block diagram of a system 700 according to one embodiment of the present invention.

An exemplary system 700 suitable to provide the virtual environment described above is depicted in FIG. 8. In the depicted embodiment, system 700 includes a game server 702 and a credit card server 704. As shown, game server 702 may include a Create Financing Agreement Program 706, an Upsell Financing Program 708, a Financing Payment Program 710, and an Inventory Lock Program 712. Credit card server 704 may include a Lock Credit Line Program 714, a Charge Financing Payment Program 716, and a Release Credit Line Program 718.

Game Server 702 may include a plurality of databases. Non-limiting examples of the types of databases that may reside on game server 702 include, player database 720, player character database 722, financing offer database 724, financing agreement database 726, and credit card server 728.

According to one embodiment, Player Database 720 may include information such as:

1. Player ID
2. Player Billing Info
3. Player Personal Info
4. Player Characters 1-n According to one embodiment, Player Character Database 722 may include information such as:

1. Player Character ID
2. Assets

3. Accounts
4. Financing Agreements

According to one embodiment, Financing Offer Database 724 may include information such as:

1. Offer ID
2. Character ID(s)
3. Group ID
4. Financing Terms and Conditions

According to one embodiment, Financing Agreement Database 726 may include information such as:

1. Agreement ID
2. Virtual Asset or Item ID
3. Buyer Player Character
4. Seller Player Character
5. Financing Entity Credit Card Server 704 may include any needed databases including, for example, an Account Holder Database 728.

According to one embodiment, game server 702 may be configured to set up a seller initiated Financing Offer. Accordingly, game server 702 may be include one or more programs which are configured to:

1. Receive a product to sell, including financing terms and conditions
2. Post item for sale, including financing terms and conditions According to one embodiment, game server 702 may be configured to set up a third party initiated Financing Offer. Accordingly, game server 702 may be include one or more programs which are configured to:

1. Receive a product to sell
2. Determine if product qualifies for financing based on third party terms and conditions
3. Create financing terms and conditions for product
4. Post item for sale, including financing terms and conditions offered by third party (third party could be game server, virtual bank, or other player character)

According to one embodiment, game server 702 may be configured to Make a Financing Offer with credit card as security. Accordingly, game server 702 may be include one or more programs which are configured to:

1. Receive a request to buy a virtual item from a player character
2. Determine if player qualifies for financing offer
3. Determine if product has financing terms and conditions
4. If player character qualifies and financing offer is available, output financing offer to customer
5. Receive acceptance of offer, including credit card number
6. Verify credit card and lock credit line
7. Create and Store Financing Agreement
8. Transmit virtual item to player character account According to one embodiment, game server 702 may be configured to allow a player character to Make a Financing Payment with credit card as security. Accordingly, game server 702 may be include one or more programs which are configured to:

1. Determine a financing payment is due on a virtual item
2. Withdraw virtual payment amount from player character account
3. If virtual cash is not available
4. Retrieve credit card stored with financing agreement
5. Determine a real cash amount equal to virtual payment amount
6. Charge real cash amount to player character credit card
7. Convert real cash amount into virtual cash
8. Transmit virtual cash payment to financing party According to one embodiment, game server 702 may be configured to lock an item being financed in Inventory. Accordingly, game server 702 may be include one or more programs which are configured to:

1. Receive a request to sell an item
2. Determine if an item is being paid for with a financing agreement
3. If the item is being paid for with a financing agreement
4. Prohibit Sale of item
5. Notify seller that item cannot be sold until financing has been completely paid According to one embodiment, game server 702 may be configured to allow a player character to pay back loan remainder if item being financed is sold. Accordingly, game server 702 may be include one or more programs which are configured to:

1. Receive an indication that a virtual item is sold
2. Determine if there is a financing agreement on the item
3. If there is a financing agreement on the item,
4. retrieve financing balance
5. Remove financing balance from sale proceeds
6. Transmit remainder to player character account According to another embodiment, the present invention provides for a Virtual Credit Card in a virtual environment. According to this embodiment, a virtual credit card that has the same benefits as a regular, i.e., real world credit card. A player character can register and/or apply for a virtual credit card with a virtual bank or other lending institution, including a game server, player character, group of player characters, or third party credit card company, which credit card company may also be an issuer of real credit cards. The issuing party retrieves the real and/or virtual credit score and history of the player character requesting the card. Based on the credit score and history and/or other factors, a maximum virtual credit line and an interest rate is established and output to the player character. If the player character accepts the terms, a virtual credit card account is created for him and a virtual credit card is added to his inventory. The virtual credit card may include spending limits, maximum single or multiple purchase limits, preestablished or variable interest rates, reward program terms and conditions and/or other terms and conditions and/or features as determined by the lending institution and/or as agreed by and between the lending institution and the borrower.

A character can use the virtual credit card to make purchases in the game. Periodically, the issuing party may determine that a payment due based on the outstanding balance due and the specified interest rate. A real or virtual invoice and/or notice may be generated and sent to the character who holds the credit card and/or a payment can automatically be taken from the character's bank account and transferred to the lender, e.g., the credit card issuer, or the character can pay the invoice by a specified date/time due. If the character does not make the payment, pays late or does not have sufficient virtual cash in his account to make the required payment, the items he purchased with the credit card and/or additional virtual assets can be seized by the credit card issuer and/or the game server and/or resold to recoup the money.

According to an another embodiments, the virtual credit line can be secured by the credit line of a real world credit card owned by the player character and/or by one or more third parties' credit or other real world financial collateral/assets/funds. If the player character cannot make his virtual cash payments, the real cash value of those payments can be determined and charged to a real world credit card (or taken from any other real world financial account) associated with the player character account. Such real world credit cards/accounts may be owned or controlled by the player character and/or by one or more third parties.

According to a further embodiment, in the event of a payment default, another third party character player may pay (i.e., lend) the amount due in exchange for a promise to pay at a higher interest rate, and/or provide a service and/or provide the third party lender with a desired item or object or game attribute and/or under any other terms agreed upon by the defaulting player character and such third party(ies).

According to a still further embodiment, when making a purchase with a virtual credit card, or along with payment notices, or when paying a virtual credit card bill, credit card issuers or other lenders, and/or advertisers, may present one or more marketing messages to credit card holders. The message can be in the form of a virtual or printed advertisement. The advertisement can be related to the virtual purchase history of the player character. For instance, a player character who frequents a virtual casino and pays for his gambling with his credit, can be offered free credit from another virtual casino to gamble at their virtual establishment. The virtual advertisements can automatically apply rewards, discounts, and special pricing to purchases made with the advertisers using the virtual credit card.

Figure 9:
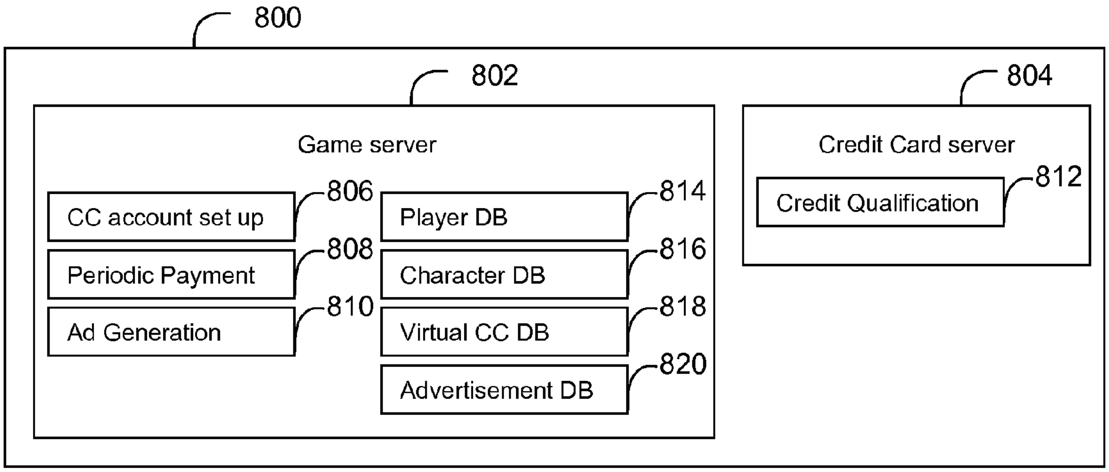
FIG. 9 is a block diagram of a system 800 according to one embodiment of the present invention.

An exemplary system 800 configured to provide a virtual environment such as that described above is shown in FIG. 9. As shown, system 800 may include a game server 802 and a credit card server 804. Game server 802 may include any suitable program including, but not limited to, a credit card account set up program 806, a periodic payment program 808, and a generate advertisements for virtual credit card invoice program 810. Credit card server 804 may include any suitable program including, but not limited to, a credit qualification program 812.

Game Server 802 may further include a plurality of databases including, for example, player database 814, a player character database 816, a virtual credit card database 818, and an advertisement database 820.

According to one embodiment, Player Database 814 may include data such as:

1. Player ID
2. Player Personal Information
3. Player Billing Information
4. Real World Credit Score
5. Player Characters 1-n According to one embodiment, Player Character Database 816 may include data such as:

1. Character ID
2. Character Credit Score
3. Character Assets and Attributes

According to one embodiment, Virtual Credit Card Database 818 may include data such as:

1. Credit Card Number
2. Character ID
3. Virtual Balance
4. Virtual Transactions
5. Virtual Credit Line According to one embodiment, Advertisement Database 820 may include data such as:

1. Advertisement ID
2. Advertisement Descriptor
3. Relevant Characters Characteristics
4. Relevant Player Characteristics
5. Relevant Virtual Transaction History
6. Advertisement Hyperlink
7. Advertisement Discount
8. Advertisement Virtual Fee Per Impression
9. Advertisement Virtual Fee Per Click According to one embodiment, game server 802 may be configured to allow player characters to register for card. Accordingly, game server 802 may be configured to:

1. Receive a Request for Virtual Credit Card from a Player Character
2. Generate Virtual Credit Score for Player Credit Card
3. Determine Virtual Credit Line
4. Create Virtual Credit Card Account
5. Output account creation notice to player character (and game server if Bank Server is issuing card)

According to some embodiments, game server 802 may be configured to prequalify player characters for credit cards and offer cards to those prequalified player characters. Accordingly, game server 802 may be configured to:

1. Qualify a Player Character for a Virtual Credit Card
2. Receive Player Character Log in
3. Output Credit Card Upsell
4. Receive acceptance of upsell offer
5. Create virtual credit card account
6. Output account creation notice to player character According to an alternate embodiments, game server 802 may be configured to:

1. Receive a player character log in
2. Output credit card upsell
3. Receive acceptance of upsell offer
4. Determine a virtual credit line based on player character virtual credit score
5. Create Virtual Card Account
6. Output account creation notice to player character According to some embodiments, game server 802 may be configured to help a player character make a purchase with a virtual credit card. Accordingly, game server 802 may be configured to:

1. Receive a request to make a virtual purchase from a player character
2. Output payment options, including credit card if account exists and credit line is available
3. Receive credit card as payment choice
4. Charge virtual purchase to virtual card account
5. Mark virtual purchase as paid According to some embodiments, game server 802 may be configured to generate an invoice and help a player character make virtual payment. Accordingly, game server 802 may be configured to:

1. Determine that a virtual payment is due for a virtual credit card
2. Generate and output a virtual invoice including a virtual payment amount and a date due to the player character
3. Receive payment on or before due date
4. Or
5. If no payment is received by date due
6. Retrieve credit card associated with player character
7. Determine a real cash value for the virtual payment amount plus applicable fees
8. Charge real cash value to credit card
9. Convert real cash into virtual cash
10. Mark virtual payment as paid According to some embodiments, game server 802 may be configured to help a player character make automated virtual payments. Accordingly, game server 802 may be configured to:

1. Determine that a virtual payment is due for a virtual credit card
2. Withdraw virtual payment amount from player character virtual account
3. Or
4. If no payment is received by date due
5. Retrieve credit card associated with player character
6. Determine a real cash value for the virtual payment amount plus applicable fees
7. Charge real cash value to credit card
8. Convert real cash into virtual cash
9. Mark virtual payment as paid According to some embodiments, game server 802 may be configured to determine advertisements for invoice. Accordingly, game server 802 may be configured to:

1. Determine advertisements for invoice
2. Generate a virtual invoice for a virtual credit card
3. Determine appropriate advertisements for credit card based on player character transaction history, player character characteristics, and player characteristics
4. Attach advertisements to invoice
5. Transmit invoice to player character including advertisements
6. Flag advertisement as sent According to some embodiments, game server 802 may be configured to create a click through advertisement on an invoice. Accordingly, game server 802 may be configured to:

1. Receive a click on an advertisement on a virtual invoice
2. Output a web page in response to the advertisement
3. Flag advertisement as clicked According to yet another embodiment, the invention provides for a virtual environment including a Virtual Collection Agency. In the event a player character defaults on a virtual or real loan, the credit card issuer, bank or other player character or entity holding the note or financial obligation, may opt to transfer part or all of such obligation to another player character, bank, or other lending institution, any or all of which may serve as a collection agency.

The collection agency may pay the note holder an up front fee and/or percentage of the total outstanding debt, in exchange for the potential future value of the final collected amount, i.e., a discount payment or other amount for the "transfer of paper", and/or may remit a percentage of the final collected amount to the note holder and retain the balance for its efforts. The collection agency may also take possession of the liens on any real or virtual property and/or take actual possession of same and either hold it until paid (i.e., akin to a pawn shop) and/or sell the assets to recover part or all of the loan.

When a player character signs up for a virtual credit card or enters into any other indebtedness or note, he may also be required by the lender to agree to permit such a transfer of his obligation, whether for collections on a default or otherwise.

Alternatively or additionally, a holder of a note or other indebtedness may sell or assign part or all of such loan or other debt in exchange for a portion or all of such note. In this way, lenders may reduce their risk and/or free up their credit lines so that they can focus on securing new loans.

According to some embodiments, the second player character can hire a loan officer that is an NPC or other player character to pursue and/or harass the first player character and force payment from him.

According to some embodiments, the bank could have NPC loan officers that it sends out to follow a player character with a delinquent loan. The delinquent player character would be followed by that NPC until he had paid his loan to the bank.

According to some embodiments, a player character avatar's appearance may be altered if there are any loans, outstanding loans, bad debts or late payments. For example, the avatar may have a "ball and chain" attached to its leg if there is a loan. The number, length, size, apparent or perceived weight or color of the ball and chain may be modified depending upon the number, size, length, interest rate, credit score, past payment performance, etc., of the player character's outstanding loans, and/or current virtual credit score. In this manner, other player characters could easily determine the current credit worthiness of any given player character. Optionally, other player characters could click on the avatar and/or, for example, the ball and chain or other indica, and receive details about that player character's loans, credit score, payment history or other financial information. Such information may optionally only be viewable by those from whom the player character has applied for credit.

According to some embodiments, the bank can request that a player character with a delinquent loan be jailed if he is late with his payments According to some embodiments, the player character with a delinquent loan, can never return to the town where the loan contract was made to dodge payment of the loan to the bank located in that town.

According to some embodiments, collection agencies can bid against each other to take over an obligation that a bank or game server posts as available.

Figure 10:
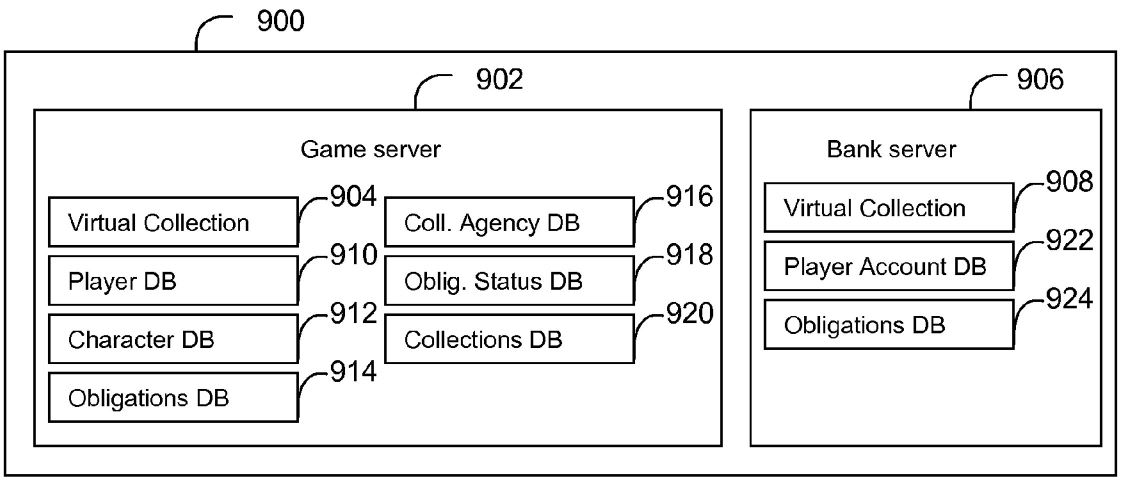
FIG. 10 is a block diagram of a system 900 according to one embodiment of the present invention.

FIG. 10 provides a block diagram of a exemplary system 900 suitable for use with the above-described embodiments. As shown, system 900 includes a game server 902 which may host, for example, a virtual collection program 904. System 900 further includes a bank server 906, which may host, for example, a virtual collection program 908.

Game Server 902 may include a plurality of databases including, but not limited to, a player database 910, a player character database 912, an obligation database 914, a collections agency database 916, an obligation status database 918, and a collections database 920.

According to one embodiment, Player Database 910 may include data such as:

1. Player ID
2. Player Personal Information
3. Player Billing Information
4. Real World Credit Score
5. Player Characters 1-n According to another embodiment, Player Character Database 912 may include data such as:

1. Character ID
2. Character Credit Score
3. Character Assets and Attributes
4. Character Obligations
5. Obligation Status According to another embodiment, Obligation Database 914 may include data such as:

1. Obligation ID
2. Obligation Descriptor
3. Obligation Terms and Conditions
4. Obligation Penalties According to another embodiment, Collections Agency Database 916 may include data such as:

1. Collections Agency ID
2. Collections Agency Descriptor
3. Collection Types
4. Penalty Types
5. Collection Methods According to another embodiment, Obligation Status Database 918 may include data such as:

1. Obligation Status ID
2. Obligation Status Descriptor
3. Obligation Status Actions According to another embodiment, Collections Database 920 may include data such as:

1. Collection ID
2. Collection Agency ID
3. Player Character ID
4. Penalty Method
5. Collection Terms and Conditions Bank Server 906 may similarly host any number of suitable databases including, for example a player character account database 922 and an obligation database 924.

According to one embodiment, Player Character Account Database 922 may include information such as:

1. Player Character ID
2. Account ID
3. Obligation ID 1-n

According to an embodiment, Obligation Database 924 may include information such as 1. Obligation ID
2. Player Character ID
3. Obligation Penalties
4. Obligation Terms and Conditions According to one embodiment, game server 902 may be configured to set up conditions for obligation Transfer at the time the obligation is created. Accordingly, game server 902 may be configured to:

1. Receive an obligation request from a player character
2. Determine conditions for obligation transfer (to a virtual collection agency)
3. Output conditions to the player character
4. Receive acceptance of conditions from the player character
5. Create Obligation for the player character According to one embodiment, game server 902 may be configured to:

1. Determine that an obligation is in default
2. Retrieve conditions for obligation transfer
3. Transfer obligation to collection agency based on conditions According to another embodiment, game server 902 may be configured to:

1. Determine that an obligation in default based on conditions
2. Output offer to transfer obligation to multiple collection agencies
3. Receive acceptance of offer from a collection agency
4. Transfer obligation to collection agency

CONCLUSION

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as “at least one widget” covers one widget as well as more than one widget), and where in a second claim that depends on the first claim, the second claim uses a definite article “the” to refer to the limitation (e.g., “the widget”), this does not imply that the first claim covers only one of the feature, and this does not imply that the second claim covers only one of the feature (e.g., “the widget” can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as “first”, “second”, “third” and so on) is used as an adjective before a term, that ordinal number is used (unless expressly specified otherwise) merely to indicate a particular feature, such as to distinguish that particular feature from another feature that is described by the same term or by a similar term. For example, a “first widget” may be so named merely to distinguish it from, e.g., a “second widget”. Thus, the mere usage of the ordinal numbers “first” and “second” before the term “widget” does not indicate any other relationship between the two widgets, and likewise does not indicate any other characteristics of either or both widgets. For example, the mere usage of the ordinal numbers “first” and “second” before the term “widget” (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers “first” and “second” before the term “widget” does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computer, the method comprising:

providing, by a Video Game Central Server, a virtual environment including a virtual bank;

providing, by the Video Game Central Server, a virtual currency loan to a character interacting with the virtual environment;

receiving, by the Video Game Central Server, real world credit card information from a player controlling the character;

associating, by the Video Game Central Server, the real world credit card information with the loan;

creating, by the Video Game Central Server, a bank account for a second character;

receiving, by the Video Game Central Server, a deposit of virtual currency from the second character and associating the deposit with the second character's bank account;

determining, by the Video Game Central Server, an interest rate for the bank account;

making, by the Video Game Central Server, a periodic payment to the bank account based on the interest rate and the bank account's balance; and providing, by the Video Game Central Server, the second character with a user interface wherein the second character can indicate limitations on the use of currency deposited by the second character into the bank.

2. The method of claim 1 wherein the limitations include limiting the use of the currency to certain types of loans.

3. The method of claim 2 wherein the limitations further include limiting the loan to characters whose credit scores are above a certain threshold value.

4. The method of claim 1 further comprising using, by the Video Game Central Server, the real world credit card information as a guaranty for the loan.

5. The method of claim 4 comprising:

determining, by the Video Game Central Server, if the loan account is past due; and if the bank account balance is past due, charging, by the Video Game Central Server, an amount to the real world credit card.

6. The method of claim 1 further comprising determining, by the Video Game Central Server, if the character is qualified for a loan.

7. The method of claim 6 wherein determining if the character is qualified for a loan comprises determining a credit score for the character.

8. The method of claim 7 wherein the step of determining a credit score for the character comprises identifying a real world credit score for the player.

9. A method performed by a computer, the method comprising:

providing, by a Video Game Central Sewer, a virtual environment including a virtual bank;

receiving, by the Video Game Central Sewer, virtual project proposals from a character in the virtual environment;

determining, by the Video Game Central Server, the credit rating of the character presenting the proposals;

determining, by the Video Game Central Sewer, a project value based on the project request and the credit ratings of the characters;

determining, by the Video Game Central Server, terms of a venture capital investment agreement based on the project value;

outputting, by the Video Game Central Server, an investment offer to the character;

receiving, by the Video Game Central Server, an acceptance of the offer;

creating, by the Video Game Central Server, a virtual project agreement;

associating, by the Video Game Central Server, real world credit card information for a player controlling the character with the virtual project agreement;

determining, by the Video Game Central Server, if an investment payment is overdue; and if the investment payment is overdue, charging, by the Video Game Central Server, an amount to the real world credit card.

10. The method of claim 9 wherein the step of determining the credit rating of the character comprises identifying the real world credit rating for a player controlling the character.

11. The method of claim 9 wherein the investment offer includes a percentage ownership of the project for the virtual bank.

12. The method of claim 9 wherein the investment offer includes a dividend schedule.

13. The method of claim 9 wherein the investment offer includes an investment payment schedule.

14. The method of claim 13 wherein the investment payments are automatically debited from the character's account.

* * * * *